United States Patent [19]

Sugita

[11] Patent Number: 5,579,531
[45] Date of Patent: Nov. 26, 1996

[54] SYSTEM FOR SELECTING PATH AMONG PLURALITY OF PATHS USING PLURALITY OF MULTIPLEXERS COUPLED TO COMMON BUS TO TRANSFER DATA BETWEEN PERIPHERAL DEVICES AND EXTERNAL DEVICE

[75] Inventor: Mitsuru Sugita, Itami, Japan

[73] Assignee: Mitsubishi Denki Kabushiki Kaisha, Tokyo, Japan

[21] Appl. No.: 26,941

[22] Filed: Mar. 5, 1993

[30] Foreign Application Priority Data

Apr. 28, 1992 [JP] Japan .................................. 4-136201

[51] Int. Cl.⁶ .................................................. G06F 15/02
[52] U.S. Cl. .................... 395/871; 395/800; 364/230.3; 364/231.5; 364/240.4; 364/DIG. 1
[58] Field of Search ................................... 395/275, 325, 395/725, 871, 800

[56] References Cited

U.S. PATENT DOCUMENTS

| | | | |
|---|---|---|---|
| 4,400,778 | 8/1983 | Vivian et al. .......................... 395/550 |
| 4,914,625 | 4/1990 | Billian ..................................... 395/775 |
| 5,005,170 | 4/1991 | Nelson ..................................... 370/84 |
| 5,276,808 | 1/1994 | Cheney et al. .......................... 395/250 |
| 5,313,624 | 5/1994 | Harriman et al. .................. 395/182.04 |

*Primary Examiner*—Thomas C. Lee
*Assistant Examiner*—Moustafa Mohamed Meky
*Attorney, Agent, or Firm*—Townsend and Townsend and Crew LLP

[57] ABSTRACT

In a semiconductor device having an MPU and a plurality of peripheral devices controlled by the MPU through a bus, to facilitate the interconnection of the peripheral devices without the use of the MPU, improve response speed and the processing speed of a main program by eliminating an interrupt processing from the processings of the MPU, facilitate changes in the interconnection of the peripheral devices, and enable a reduction in the number of external terminals, event buses for transmitting event signals are provided between the peripheral devices or between the peripheral devices and the external terminals so that the connection between the peripheral devices and the external terminals can be switched by the multiplexers.

5 Claims, 20 Drawing Sheets

SYSTEM FOR SELECTING PATH AMONG PLURALITY OF PATHS USING PLURALITY OF MULTIPLEXERS COUPLED TO COMMON BUS TO TRANSFER DATA BETWEEN PERIPHERAL DEVICES AND EXTERNAL DEVICE

BACKGROUND OF THE INVENTION

1. Field of the Invention

The present invention relates to a semiconductor device having a microprocessor (abbreviated as MPU hereinafter) and a plurality of peripheral devices controlled by the microprocessor like a one-chip microcomputer.

2. Description of the Prior Art

FIG. 19 is a block diagram of an example of the whole configuration of a general one-chip microcomputer. In the figure, reference numeral 1 designates an MPU, 2–4 various types of peripheral devices A to C controlled by the MPU 1, 5 an interrupt control unit (abbreviated as ICU) for controlling interrupt request signals IRQA to IRQC from the peripheral devices 2 to 4 for supply to the MPU 1, 6a a data bus for exchanging data between the MPU 1 and the peripheral devices 2 to 4 and between the MPU 1 and the interrupt control unit 5, and 6b an address bus for exchanging data between the MPU 1 and the peripheral devices 2 to 4 and between the MPU 1 and the ICU 5. The peripheral devices 2 to 4 are connected to respective external terminals A to C.

The operation of the semiconductor device will be described hereafter.

Suppose that the peripheral device (A) 2 is an event counter which counts the internal clock of the microcomputer only during the input of "H" to the external terminal Ain, generates an interrupt request signal IRQA when a count value of the internal clock of the microcomputer reaches a certain value, and clears a count value during the input of "L" to the external terminal Ain. Also suppose that the peripheral device (B) 3 is a one-shot timer which starts counting in response to a start instruction provided from the MPU 1 through the data bus 6a, outputs a one-shot pulse from the external terminal Bout for a predetermined period of time, and generates an interrupt request signal IRQB after the completion of output. Also suppose that the peripheral device (C) 4 is an A/D converter which converts analog inputs from the external terminal C into digital values. Take the case when the peripheral devices have the above-mentioned functions and are controlled in such a way that the one-shot timer 3 is activated when the input of the terminal Ain is maintained at "H" for more than a predetermined period of time, and an analog value of the terminal C is measured after the completion of one-shot output.

FIG. 20 illustrates the operation of each of the peripheral devices and the waveforms of the terminals Ain and Bout. The figure illustrates the case where noise is generated at the terminal Ain. (It can be said that the event counter is used to cut off noise.) To cut off such noise, the event counter 2 is used to determine whether or not an input pulse is beyond a certain level by detecting whether the event counter 2 reaches a predetermined count value. The result of this decision is taken out as the interrupt request signal IRQA. Thereafter, ICU processing and interrupt processing are performed to activate the one-shot timer 3 by means of the MPU 1. The one-shot timer 3 generates an interrupt request signal IRQB after output of a one-shot pulse. Afterwards, ICU processing and interrupt processing are performed to activate the A/D converter 4 by means of the MPU 1 for A/D conversion.

At this time, the terminal Ain is used for the input of external events, but the terminal Aout is not used. The terminal Bin can be used for the input of a clock to the one-shot timer 3, but may not be used when the internal clock of the microcomputer is inputted.

In most cases, the above-mentioned interrupt request signals are used as control information from the peripheral devices of the conventional semiconductor device, and control information to the peripheral devices is signals from the input terminals or instructions from the MPU in most cases. Furthermore, the MPU must be used to exchange control information between the peripheral devices in many cases, with the result of lowered processing speed of the main program of the MPU and lowered response speed. It is conceivable to exchange control information by interconnecting the input and output terminals of the peripheral devices, but this makes it difficult to change the interconnection of the peripheral devices. Moreover, the semiconductor device incorporates a large number of the above-mentioned peripheral devices for many application purposes in most cases. However, although all the terminals are not required for each application purpose, for example, when a timer clock is not inputted from the external terminal, the semiconductor device requires every possible terminal.

In other words, the peripheral functions of a conventional one-chip microcomputer are fixed and are programmable themselves, but their relationships with other peripheral functions are fixed. This is a general method to provide optimum peripheral functions to as small a chip as possible in order to achieve high cost effectiveness. However, it is conceived from the future trends of one-chip microcomputer and process technologies that a large number of peripheral functions will be integrated into one chip. Then, it is obvious that conventional fixed peripheral functions will increase chip development term and costs because of a large quantity, and that multi-type, small-quantity custom-made production will not be able to achieve satisfactory cost effectiveness. Therefore, it is necessary to take consideration so that a single chip can be used for many application purposes with ease.

SUMMARY OF THE INVENTION

The present invention has been worked out to solve the above-mentioned problems, and it is an object of the invention to facilitate the interconnection of peripheral devices without the use of an MPU, improve response speed and the processing speed of a main program by eliminating an interrupt processing from the processings of the MPU, facilitate changes in the interconnection of the peripheral devices and reduce the number of external terminals.

A semiconductor device according to the first embodiment of the present invention having an MPU and a plurality of peripheral devices controlled by the MPU through a bus comprises a plurality of signal transmission means for transmitting signals between a plurality of the peripheral devices and connection switch means for selectively connecting a plurality of the peripheral devices with a plurality of the signal transmission means.

A semiconductor device according to the second embodiment of the present invention having an MPU, a plurality of peripheral devices controlled by the MPU through a bus and a plurality of external terminals connected to the peripheral devices comprises a plurality of signal transmission means for transmitting signals between a plurality of the peripheral devices and a plurality of the external terminals and connection switch means for selectively connecting a plurality of the peripheral devices or a plurality of the external terminals with a plurality of the signal transmission means.

A semiconductor device according to the third embodiment of the present invention having an MPU, a plurality of peripheral devices controlled by the MPU through a bus and a plurality of external terminals connected to the peripheral devices comprises a plurality of signal transmission means for transmitting signals between a plurality of the peripheral devices and between a plurality of the peripheral devices and a plurality of the external terminals and connection switch means for selectively connecting a plurality of the peripheral devices and a plurality of the external terminals with a plurality of the signal transmission means.

A semiconductor device according to the fourth embodiment of the present invention having an MPU and a plurality of peripheral devices controlled by the MPU through a bus comprises signal transmission means for transmitting signals between a plurality of the peripheral devices and connection switch means for connecting a plurality of the peripheral devices with the signal transmission means selectively and on a time-division basis.

A semiconductor device according to the fifth embodiment of the present invention having an MPU, a plurality of peripheral devices controlled by the MPU through a bus and a plurality of external terminals connected to the peripheral devices comprises signal transmission means for transmitting signals between a plurality of the peripheral devices and a plurality of the external terminals and connection switch means for connecting a plurality of the peripheral devices or a plurality of the external terminals with the signal transmission means selectively and on a time-division basis.

A semiconductor device according to the sixth embodiment of the present invention having an MPU, a plurality of peripheral devices controlled by the MPU through a bus and a plurality of external terminals connected to the peripheral devices comprises signal transmission means for transmitting signals between a plurality of the peripheral devices and between a plurality of the peripheral devices and a plurality of the external terminals and connection switch means for connecting a plurality of the peripheral devices and a plurality of the external terminals with the signal transmission means selectively and on a time-division basis.

In other words, in the above-mentioned first embodiment, since control information is directly transmitted between the peripheral devices by the signal transmission means and the connection switch means, automatic control without the use of the MPU is possible with the result of improved system processing speed due to a lightened processing burden on the MPU, increased response speed due to the elimination of the use of the MPU, and easy changes in the interconnection of the peripheral devices.

In the second embodiment, since the connection between the peripheral devices and the external terminals can be changed by the signal transmission means and the connection switch means, external terminals which are not frequently used can be eliminated (if necessary, they can be reconnected).

In the third embodiment, since control information can be directly transmitted between the peripheral devices by the signal transmission means and the connection switch means, automatic control without the use of the MPU is possible with the result of improved system processing speed due to a lightened processing burden on the MPU, increased response speed due to the elimination of the use of the MPU, and easy changes in the interconnection of peripheral devices. Furthermore, since the connection between the peripheral devices and the external terminals can be changed, external terminals which are not frequently used can be eliminated (if necessary, they can be reconnected).

The fourth embodiment has the same function as the first embodiment and can reduce the number of signal transmission means due to the time-division processing function of the connection switch means.

The fifth embodiment has the same function as the second embodiment and can reduce the number of signal transmission means due to the time-division processing function of the connection switch means.

The sixth embodiment has the same function as the third embodiment and can reduce the number of signal transmission means due to the time-division processing function of the connection switch means.

The above and other objects, features and advantages of the invention will become more apparent from the following description when taken in conjunction with the accompanying drawings.

DESCRIPTION OF THE PREFERRED EMBODIMENTS

Preferred embodiments of the present invention will be described with reference to the accompanying drawings.

Embodiment 1

Figure 1:
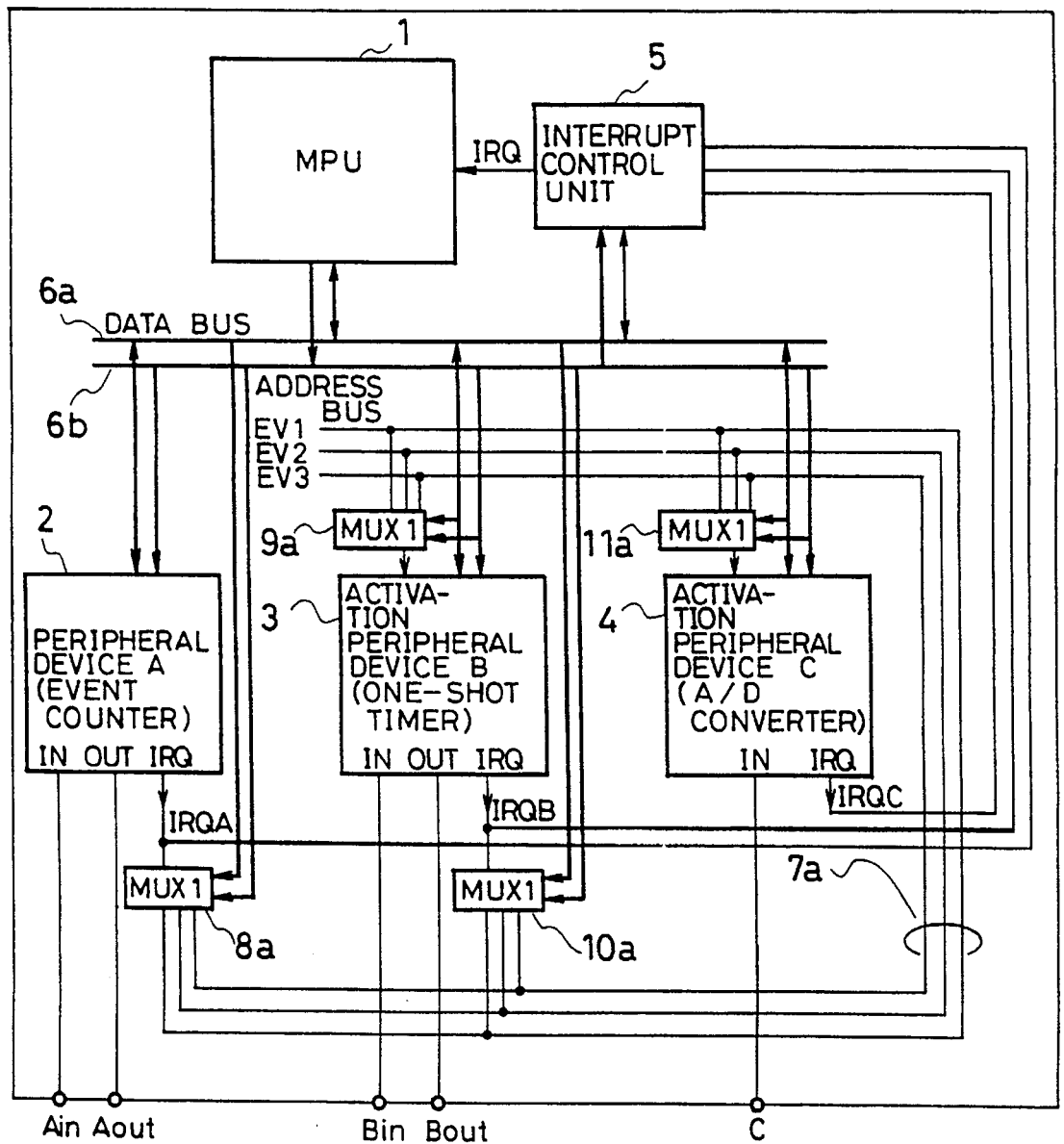
FIG. 1 is a block diagram of the whole configuration of Embodiment 1 of the present invention.
Figure 19:
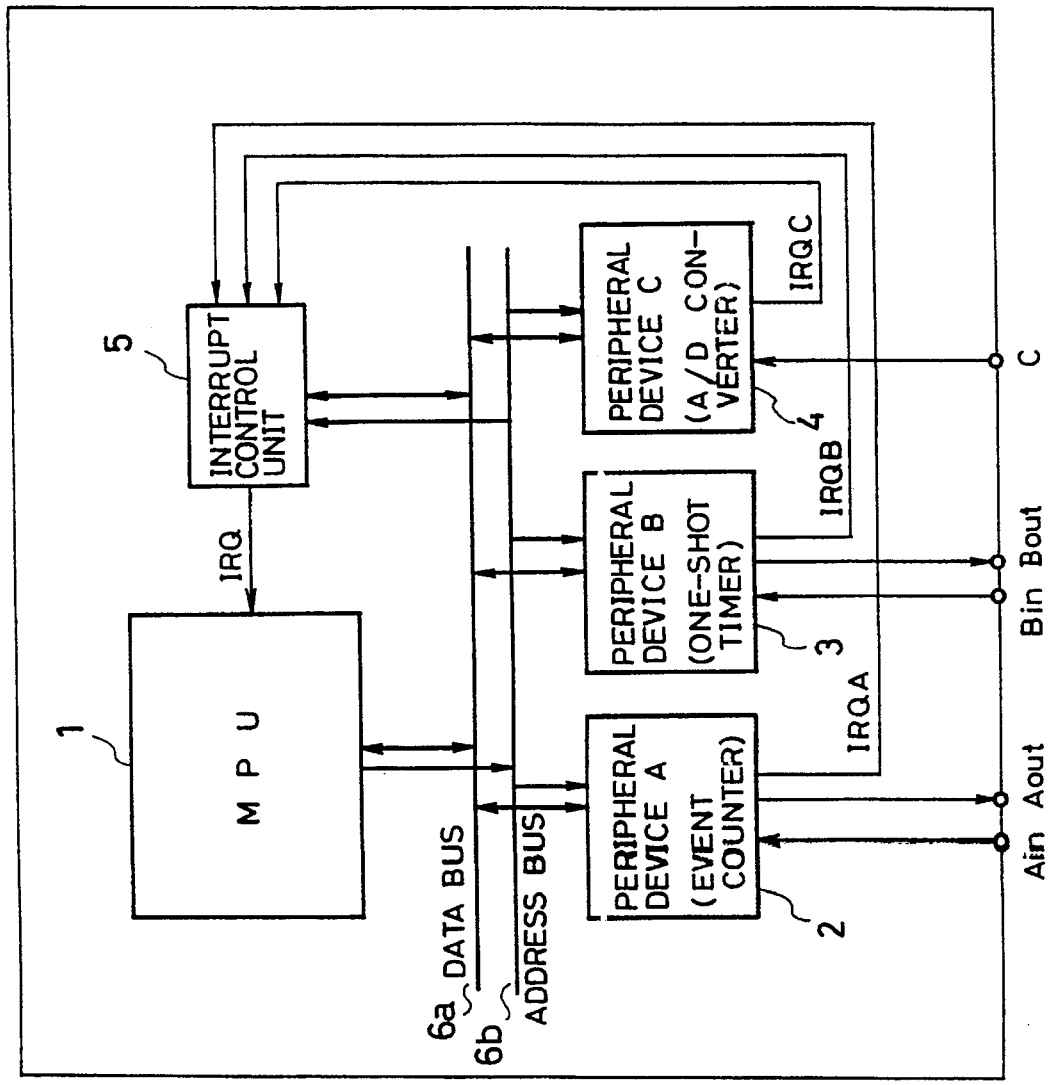
FIG. 19 is a block diagram of the whole configuration of the prior art.
Figure 20:
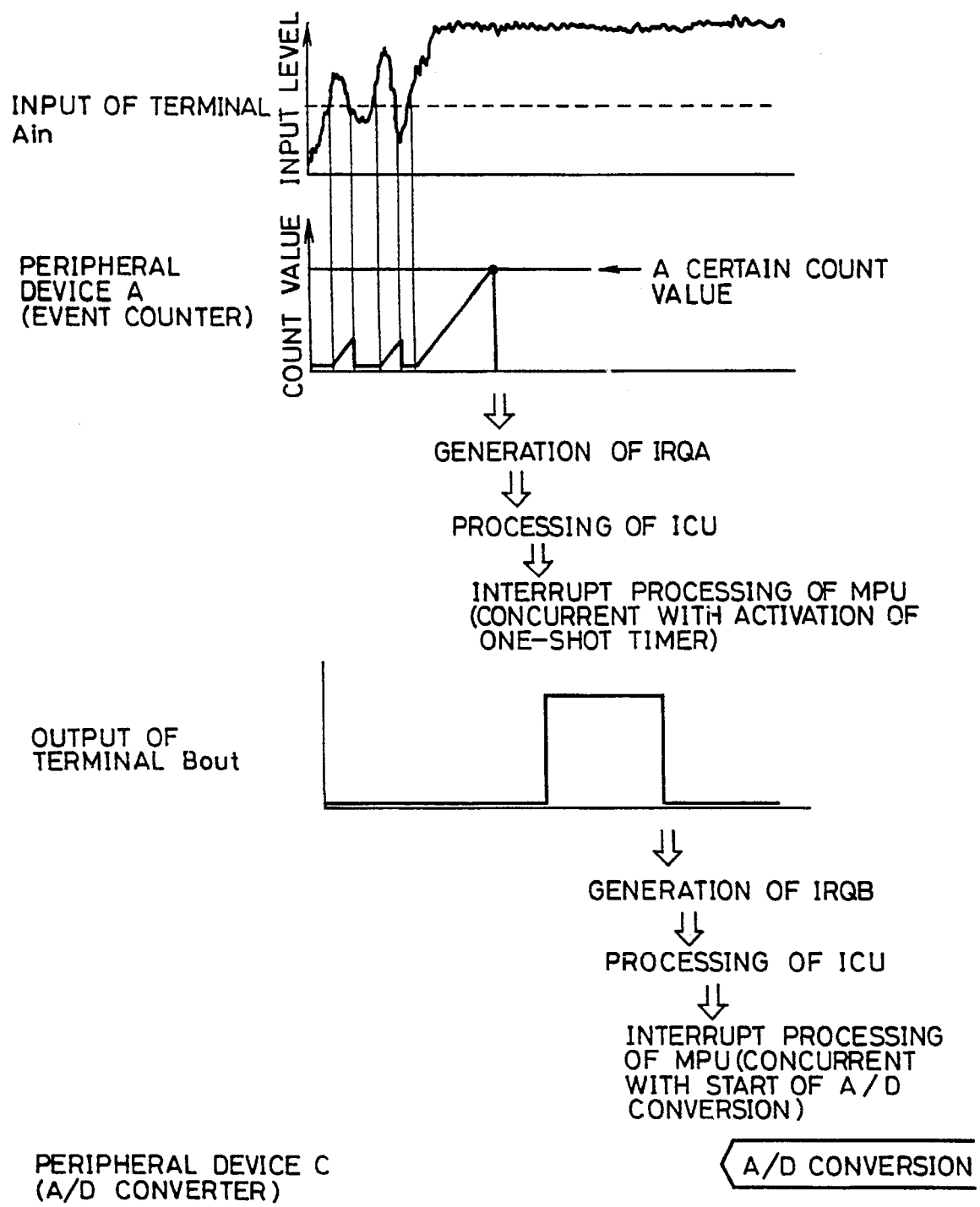
FIG. 20 is a timing chart illustrating the operation of the prior art.

FIG. 1 is a block diagram of the whole configuration of the first embodiment of the present invention in which control information is exchanged between peripheral devices without the use of the MPU 1. The same reference symbols as FIG. 19 of the prior art designate the same or corresponding elements, and their description is omitted. In FIG. 1, reference symbol 7a designates event buses as a plurality of signal transmission means for transmitting signals between a plurality of peripheral devices and which consist of three signal lines EV1, EV2 and EV3. Reference symbols 8a to 11a designate multiplexers as connection switch means for selectively connecting a plurality of the peripheral devices with a plurality of the signal transmission means. The multiplexers 8a and 10a connect the terminals IRQ of the peripheral devices 2 and 3 to one of the signal lines of the event buses 7a, and the multiplexers 9a and 11a connect the start terminals of the peripheral devices 3 and 4 to one of the signal lines of the event buses 7a. Normally, the peripheral devices are activated by writing data to a register (D latch) in each of the peripheral devices by the software of the MPU 1. The peripheral devices can be activated without the use of software by constructing the register by a D latch having a set terminal and by connecting the set terminal to the above-mentioned start terminal.

Figure 2:
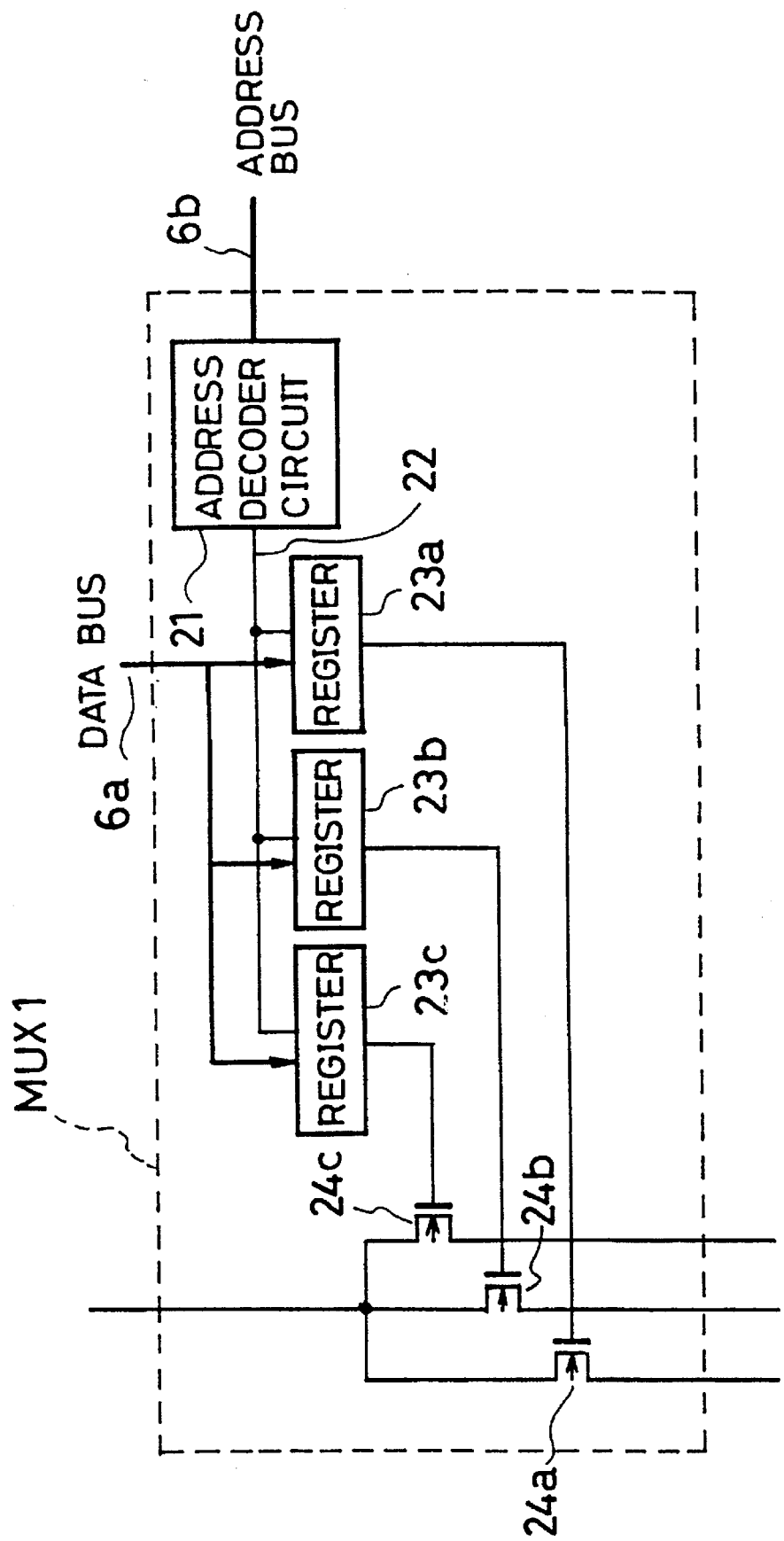
FIG. 2 is a diagram of the internal configuration of a multiplexer (MUX 1) shown in FIG. 1.

The above-mentioned multiplexers (MUX 1) 8a to 11a are structured as shown in FIG. 2, but are not limited to that structure. In FIG. 2, reference numeral 21 designates an address decoder circuit for decoding the contents of the address bus 6b to control a write signal 22, 23a to 23c designate registers to which a value of a predetermined bit of the data bus 6a is set when the write signal 22 becomes activated by the address decoder circuit 21, and 24a to 24c n-channel transistors which are turned on and off by values set to the above-mentioned registers 23a to 23c. One of the above three registers 23a to 23c is set at "1", and one of the three n-channel transistors 24a to 24c corresponding to the value is turned on, which is set in an initialization routine after the system is reset. If necessary, this setting can be changed during the operation of the peripheral devices.

The operation of this embodiment will be described in the following.

Figure 3:
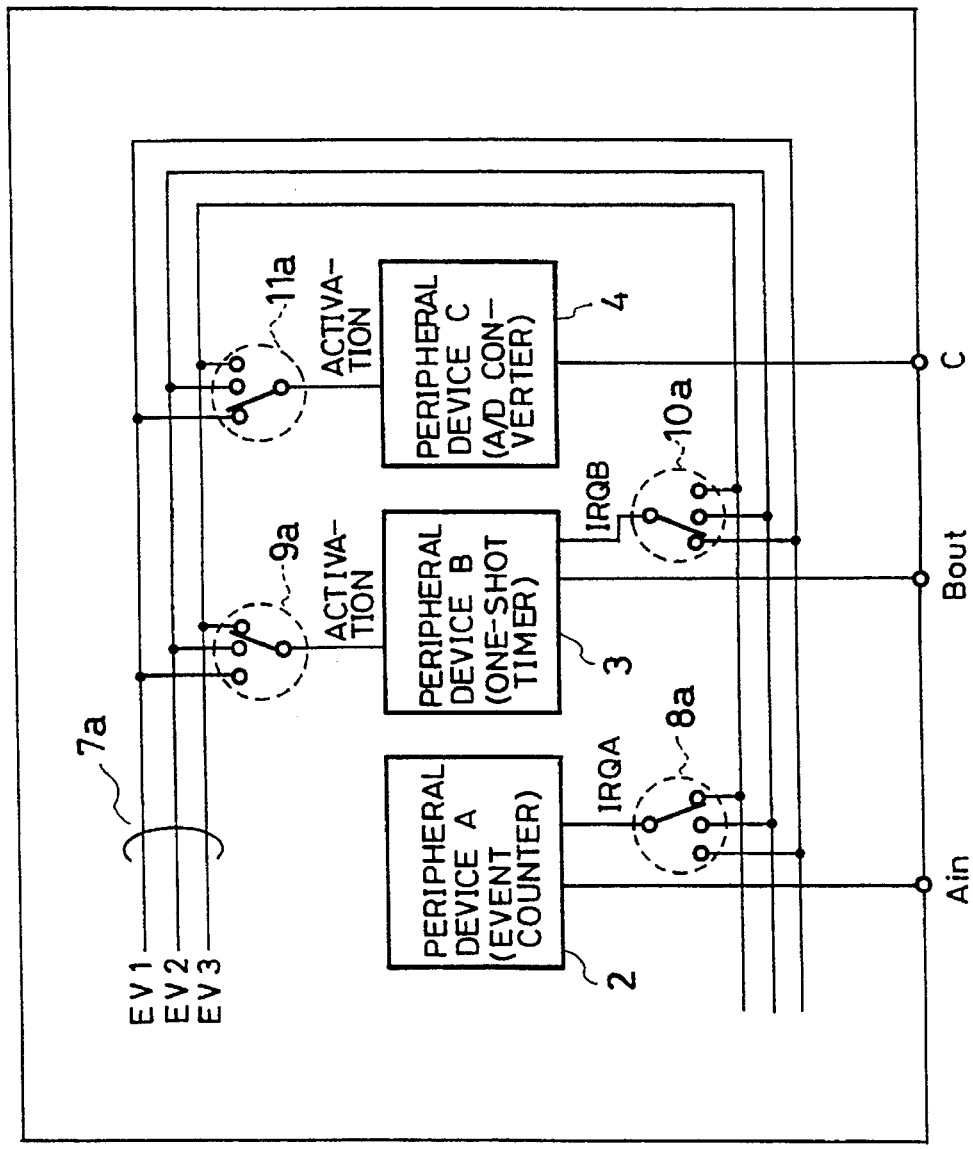
FIG. 3 is a diagram illustrating settings of the multiplexers of Embodiment 1.

To operate this embodiment in the same manner as the prior art, the first control information is the interrupt request signal IRQA of the event counter 2 for the activation of the one-shot timer 3. Therefore, as shown in the diagram of FIG. 3 (only a portion required for explaining the operation is shown), the interrupt request signal IRQA of the event counter 2 is connected to the signal line EV3, for example, of the event buses 7a by the multiplexer 8a, and the start terminal of the one-shot timer 3 is connected to the signal line EV3 of the event buses 7a by the multiplexer 9a. The second control information is the interrupt request signal IRQB of the one-shot timer 3 for the activation of the A/D converter 4. In the same manner, the interrupt request signal IRQB of the one-shot timer 3 and the start terminal of the A/D converter 4 are connected to the signal line EV1, for example, of the event buses 7a by the multiplexers 10a and 11a, respectively. As described in the foregoing, each of the multiplexers 8a to 11a is set by specifying the addresses of the multiplexers 8a to 11a and writing a desired value to the registers 23a to 23c shown in FIG. 2 in the initialization routine after the system is reset.

Figure 4:
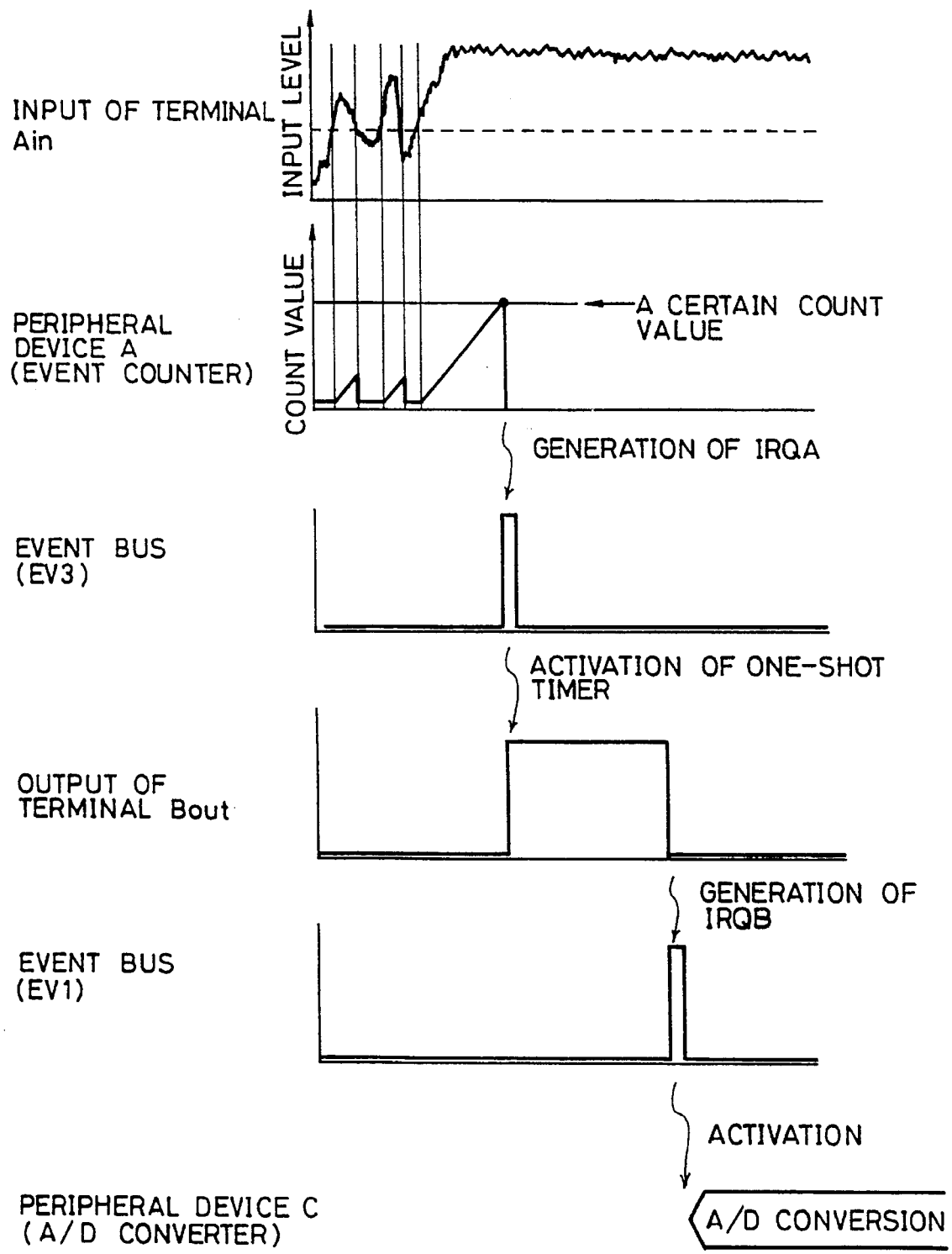
FIG. 4 is a timing chart illustrating the operation of Embodiment 1.

After completion of the above settings, the operation of the semiconductor device when receiving input from the terminal Ain is shown in FIG. 4. As shown in the figure, when the event counter 2 reaches a predetermined count value, the interrupt request signal IRQA is generated and activates the one-shot timer 3 through the multiplexer 8a, the signal line EV3 of the event buses 7a and the multiplexer 9a. After the generation of a one-shot pulse from the one-shot timer 3, the interrupt request signal IRQB is generated and activates the A/D converter 4 through the multiplexer 10a, the signal line EV1 of the event buses 7a and the multiplexer 11a.

In this way, the above-mentioned operation is effected easily by transmitting control information over the event buses 7a. Furthermore, the interconnection of the peripheral devices can be changed by the multiplexers 8a to 11a with ease.

Figure 5A:
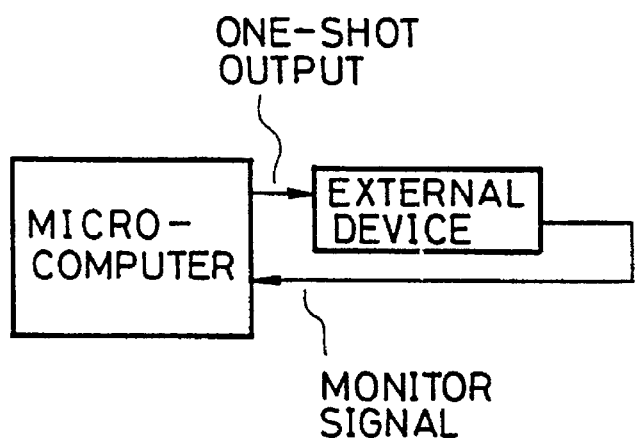
FIGS. 5(a), 5(b) and (5c) are diagrams illustrating another processing example of a microcomputer.
Figure 5B:
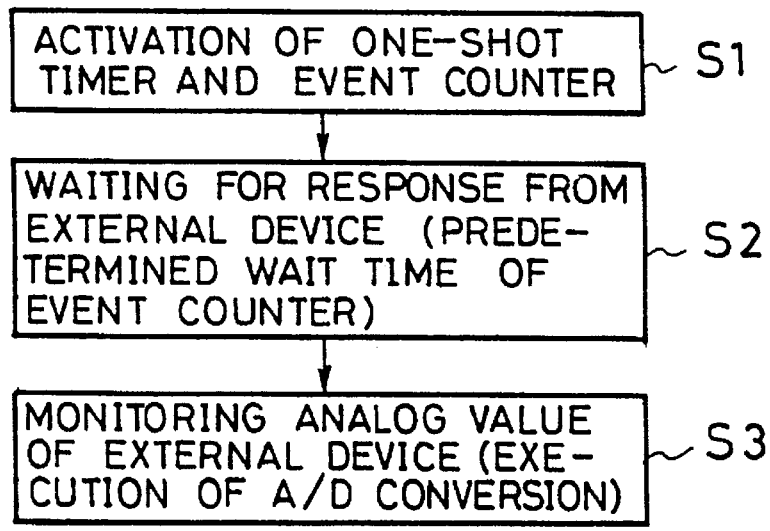
Figure 5C:
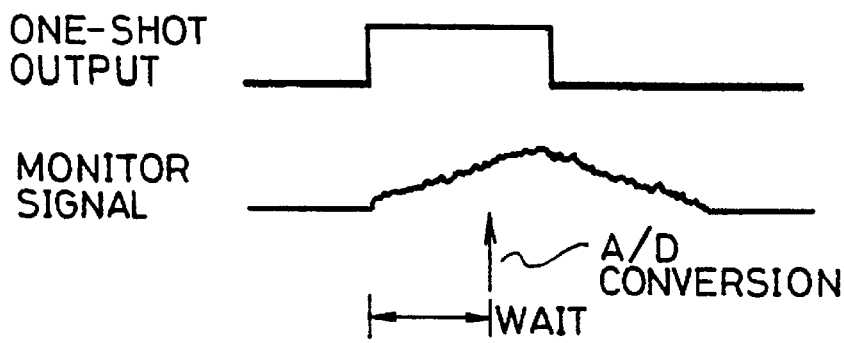

General speaking, a microcomputer is used to control input, data processing and output in the order named, and it is very important to achieve an accurate value by eliminating noise in the processing of input. Therefore, an example of processing to achieve a digital value from an analog value by cutting off noise after a certain event has been described. Here, another example of simple processing when the interconnection of the peripheral devices is changed is shown in FIGS. 5(a), 5(b) and 5(c). There are various means to control a final target (a machine, for example) by means of a microcomputer. For example, a motor is used in most cases. Such an external device is operated by the output of the microcomputer, but fault detection is required in some cases to check whether it is operating properly or not. Here is shown the case where fault detection, for example the monitoring of an analog value of the external device, is performed after response from the external device is awaited from the output of the microcomputer (FIG. 5(a)). First, in FIG. 1, the multiplexers 8a and 11a are preset in such a way that the terminal IRQ of the event counter 2 and the start terminal of the A/D converter are interconnected through the event buses 7a. As shown in the flow chart of FIG. 5(b), the one-shot timer 3 and the event counter 2 are activated (step S1), the external device is activated by one-shot output shown in FIG. 5(c), and response from the external device is awaited by the event counter 2 (step S2). After the event counter 2 awaits for a predetermined period of time, the interrupt request signal IRQA generated from the event counter 2 activates through the event buses 7a the A/D converter 4 which performs A/D conversion of a monitor signal from the external device, to monitor an analog value of the external device (step S3). The monitoring of response to output is used not only for fault detection but also for feedback control.

In a microcomputer having a large number of peripheral devices, extension is made easy by increasing the number of event buses and providing multiplexers on both input and output sides of each peripheral device. When an increase in the number of event buses is expected, it is best to integrate peripheral devices to be interconnected by event buses into one chip since a huge number of terminals are required if the event buses are located outside the semiconductor device.

Embodiment 2

In the above Embodiment 1, the peripheral devices are interconnected by the event buses to improve processing speed and response speed, and to facilitate changes in the interconnection of the peripheral devices. Another preferred embodiment of the present invention shown in FIG. 6 makes it possible to reduce the number of terminals according to the same idea as the first embodiment. The same reference symbols as those in FIG. 19 of the prior art designate the same or corresponding elements, and their description is omitted. In the figure, reference symbol 7b represents event buses as a plurality of signal transmission means for transmitting signals between a plurality of peripheral devices and a plurality of external terminals, and consists of three signal lines EV1, EV2 and EV3 like Embodiment 1. 12a to 17a represent multiplexers (MUX 1) as connection switch means for selectively connecting a plurality of the peripheral devices or a plurality of the external terminals with a plurality of the signal transmission means. The multiplexers 12a to 15a connect the terminals IN or OUT of the peripheral devices 2 and 3 to one of the signal lines of the event buses 7a, and the multiplexers 16a and 17a connect the general-purpose input/output external terminals A and B to one of the signal lines of the event buses 7b. Each multiplexer (MUX 1) has the same structure as shown in FIG. 2 of Embodiment 1.

The operation of this embodiment will be described next.

Figure 7:
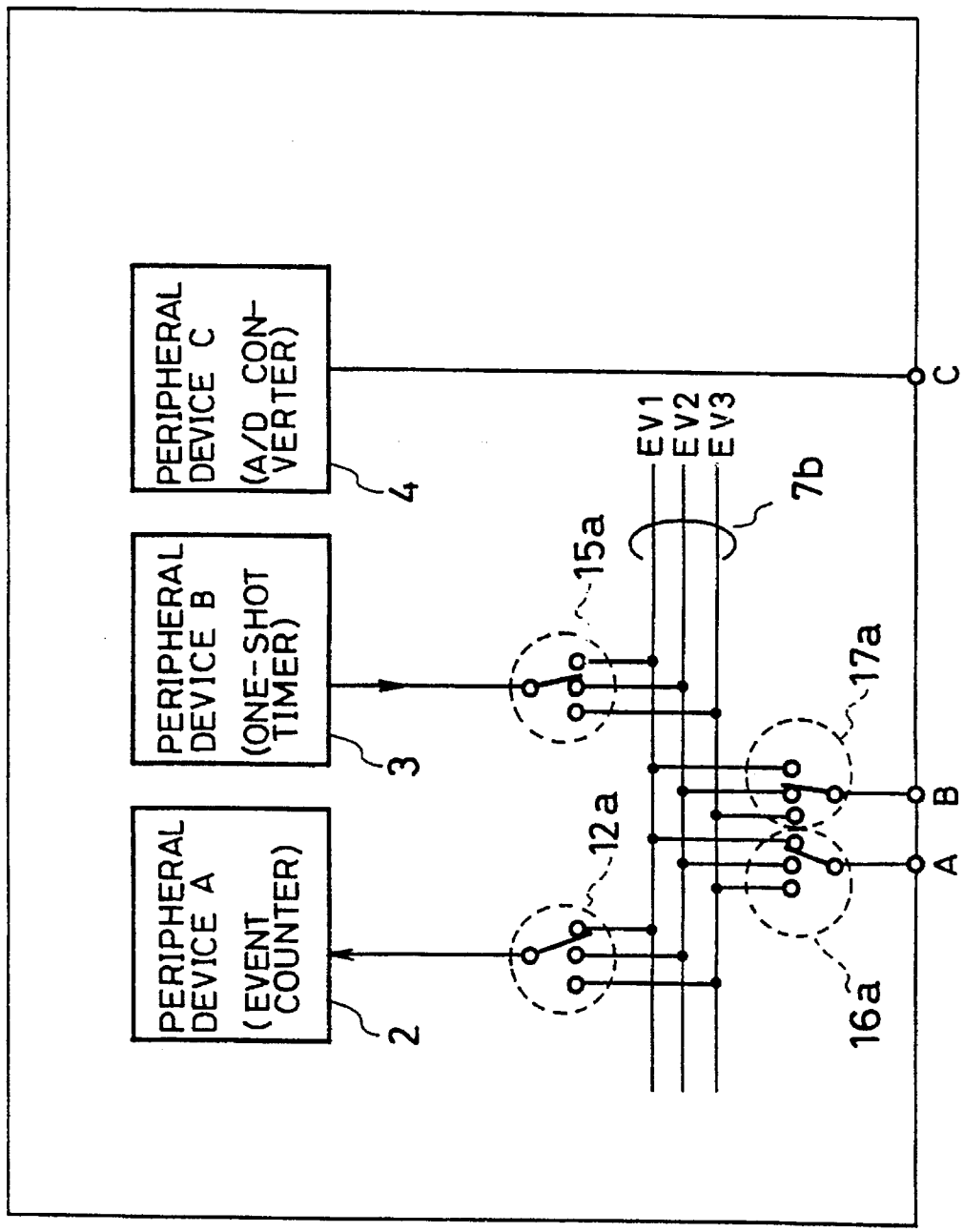
FIG. 7 is a diagram illustrating settings of the multiplexers of Embodiment 2.

To operate the embodiment in the same way as the prior art, as shown in the diagram of FIG. 7 (only a portion required for explaining the operation is shown), the general-purpose input/output terminal A is connected to the signal line EV1 of the event buses 7b by the multiplexer 16a, and the general-purpose input/output terminal B to the signal line EV2 of the event buses 7b by the multiplexer 17a. Furthermore, the input of the event counter 2 is connected to the signal line EV1 of the event buses 7b by the multiplexer 12a, and the output of the one-shot timer 3 to the signal line EV2 of the event buses 7b by the multiplexer 15a. These settings make it possible to use the terminal A as the terminal Ain of the prior art and the terminal B as the terminal Bout of the prior art.

In an actual one-chip microcomputer, there are a large number of input/output terminals for peripheral devices, all of which are not used for one particular application purpose. Therefore, it is possible to integrate these terminals and use each terminal as a general-purpose terminal. In this case, it is desirable that the event buses go through the semiconductor device as the number of event buses increases, and that peripheral devices be integrated into one chip.

Embodiment 3

Figure 8:
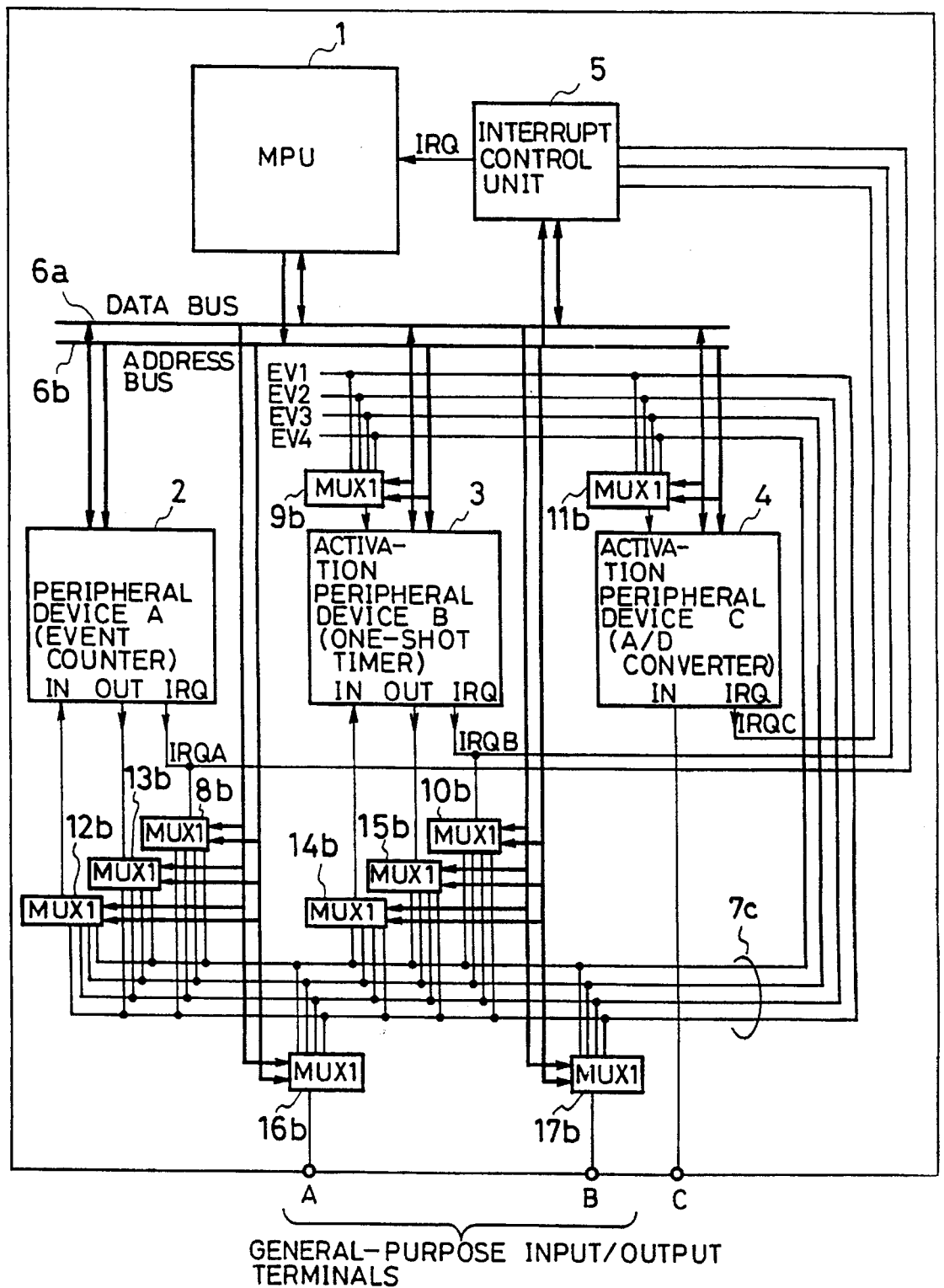
FIG. 8 is a block diagram of the whole configuration of Embodiment 3.
Figure 9:
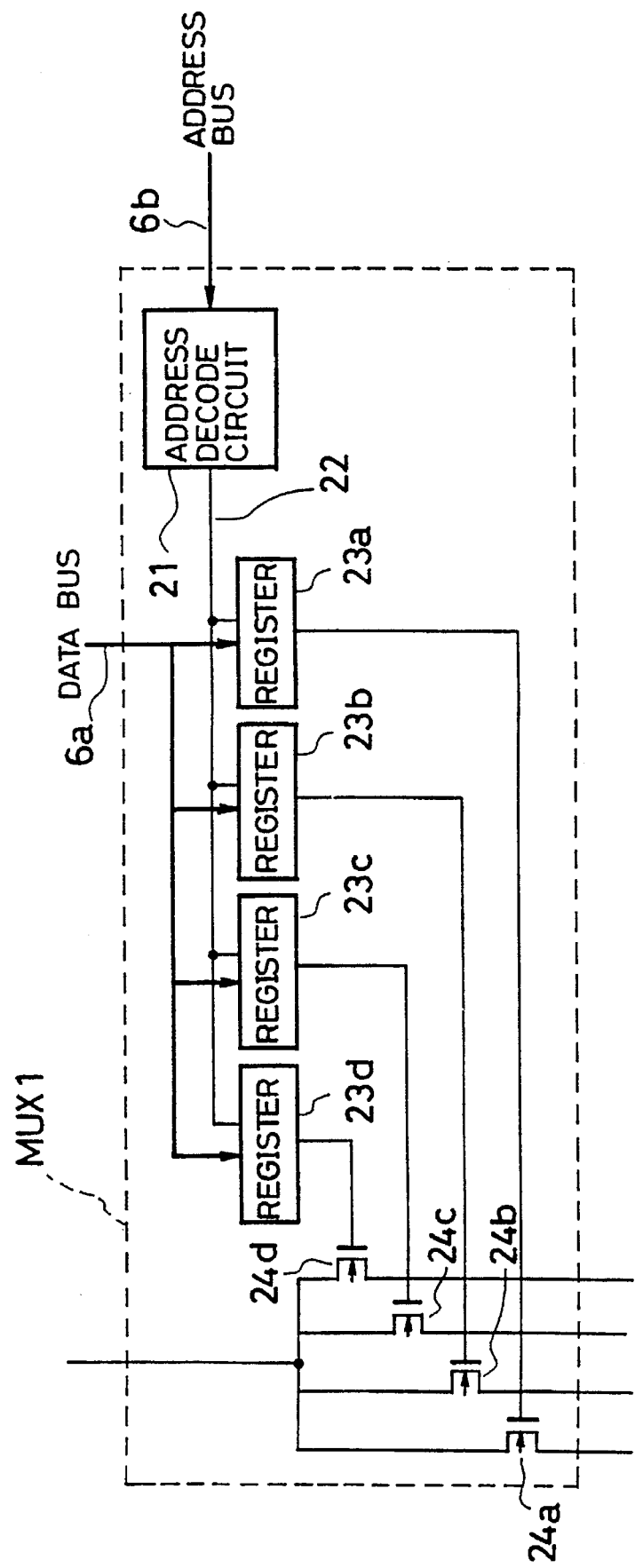
FIG. 9 is a diagram of the internal configuration of the multiplexer (MUX 1) of FIG. 8.

Since all of the above-mentioned embodiments are based on the same idea, it is possible to combine these as shown in FIG. 8. The same reference symbols as those of FIG. 19 of the prior art represent the same or corresponding elements, and their description is omitted. In FIG. 8, reference symbol 7c represents event buses as a plurality of signal transmission means for transmitting signals between a plurality of peripheral devices and between a plurality of peripheral devices and a plurality of external terminals, which consist of four signal lines EV1, EV2, EV3 and EV4. 8b to 17b represent multiplexers (MUX 1) as connection switch means for selectively connecting a plurality of the peripheral devices and a plurality of the external terminals with a plurality of the signal transmission means. The multiplexers 8b to 17b correspond to the multiplexers 8a to 17a of Embodiments 1 and 2, are connected in the same manner and have the same function as those of Embodiments 1 and 2. As shown in FIG. 9, a register 23d and a transistor 24d are added to the multiplexer shown in FIG. 2 for an additional signal line of the event buses 7c.

Figure 10:
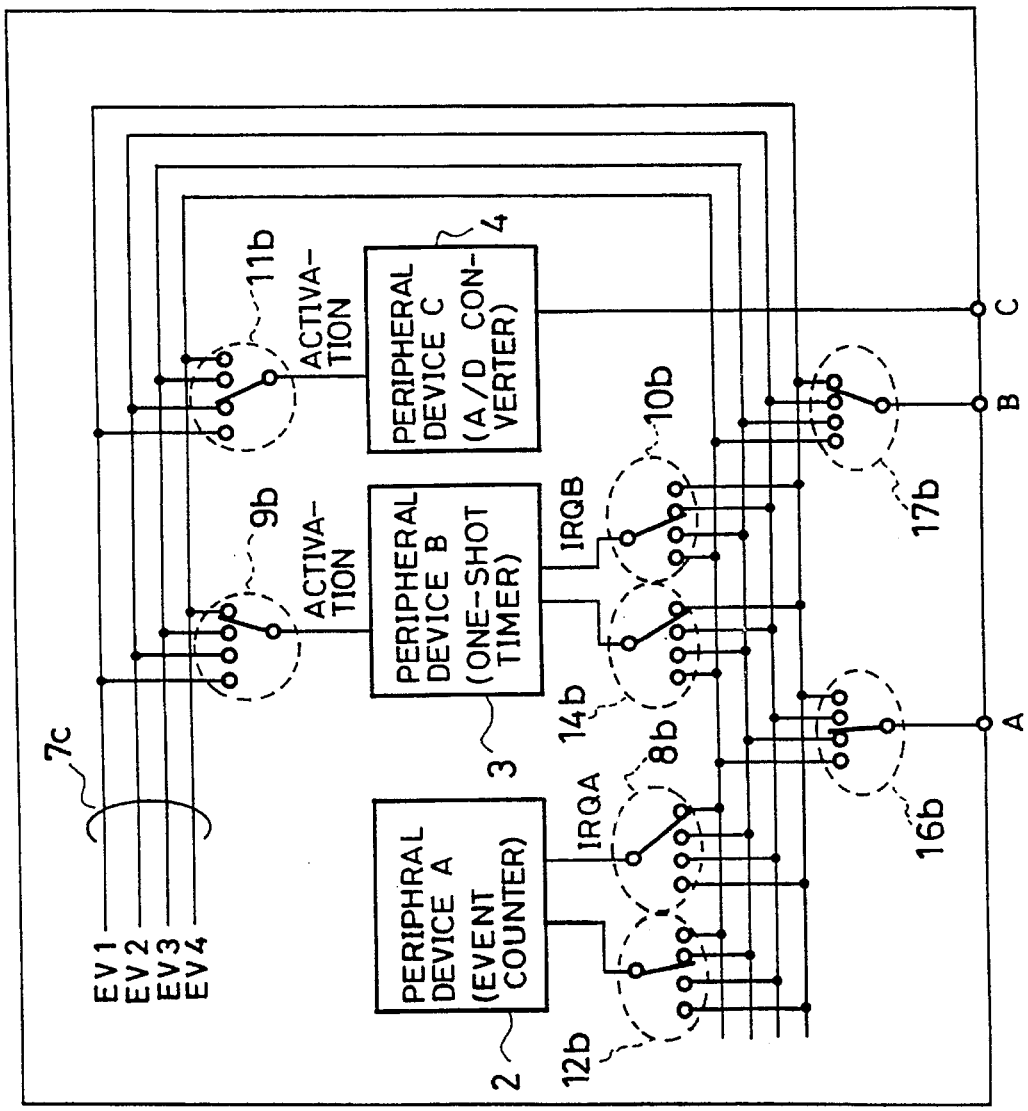
FIG. 10 is a diagram illustrating settings of the multiplexers of Embodiment 3.

To operate this embodiment in the same manner as the prior art, the multiplexers 8b to 17b are set as shown in FIG. 10, and the same function and effect as Embodiments 1 and 2 can be obtained. Due to this setting, inputs and outputs including the interrupt request signals of the peripheral devices can be directly connected with external terminals, and linked control of the peripheral devices of a plurality of semiconductor devices is possible, thus facilitating system extension without lowering response speed.

Embodiment 4

Figure 11:
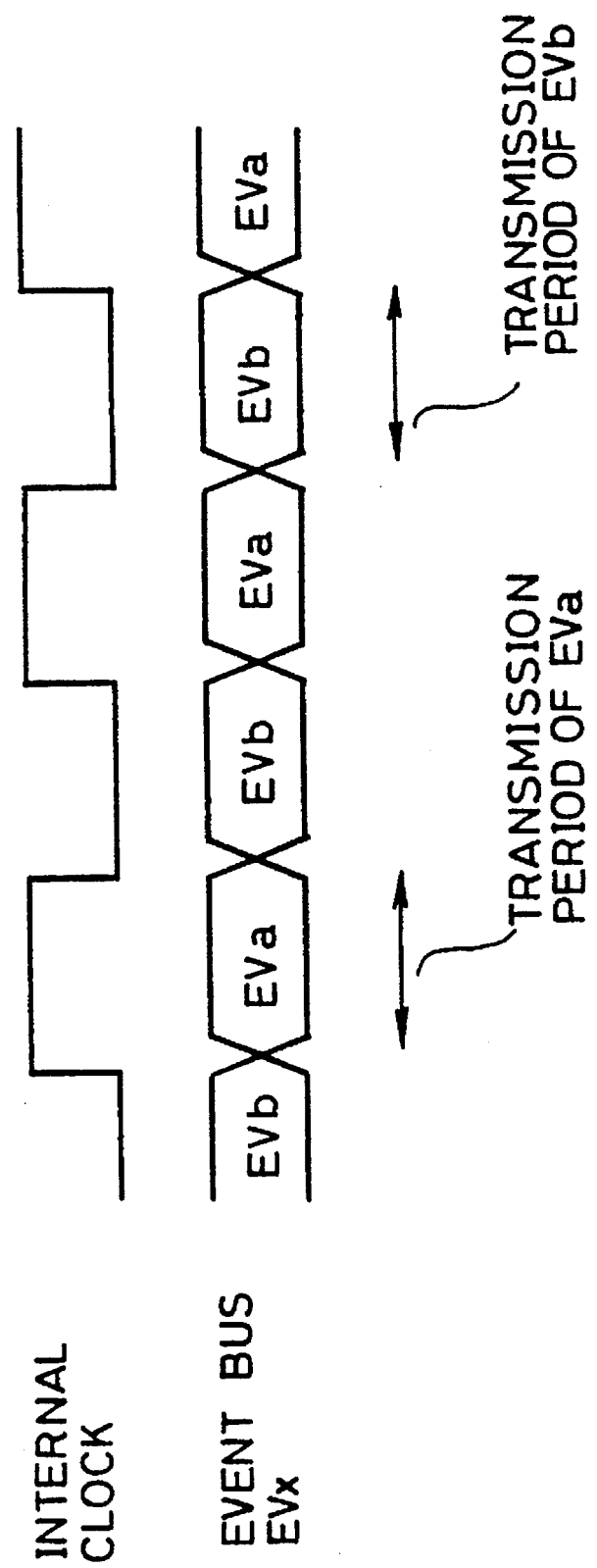
FIG. 11 is a timing chart for effecting a time-division processing function.

In the above Embodiments 1 to 3, a single event signal is transmitted over a single signal line of the event buses, and accordingly, the number of events increases in proportion to the number of event buses. To solve this problem, as shown in FIG. 11, the event buses may be provided with a function (time-division processing function) to transmit different events for a period "H" and a period "L" of an internal clock, or to transmit a plurality of events in an allowable range of time intervals for event transmission, thus making it possible to reduce the number of event buses, that is the number of wires, in the semiconductor device.

Figure 12:
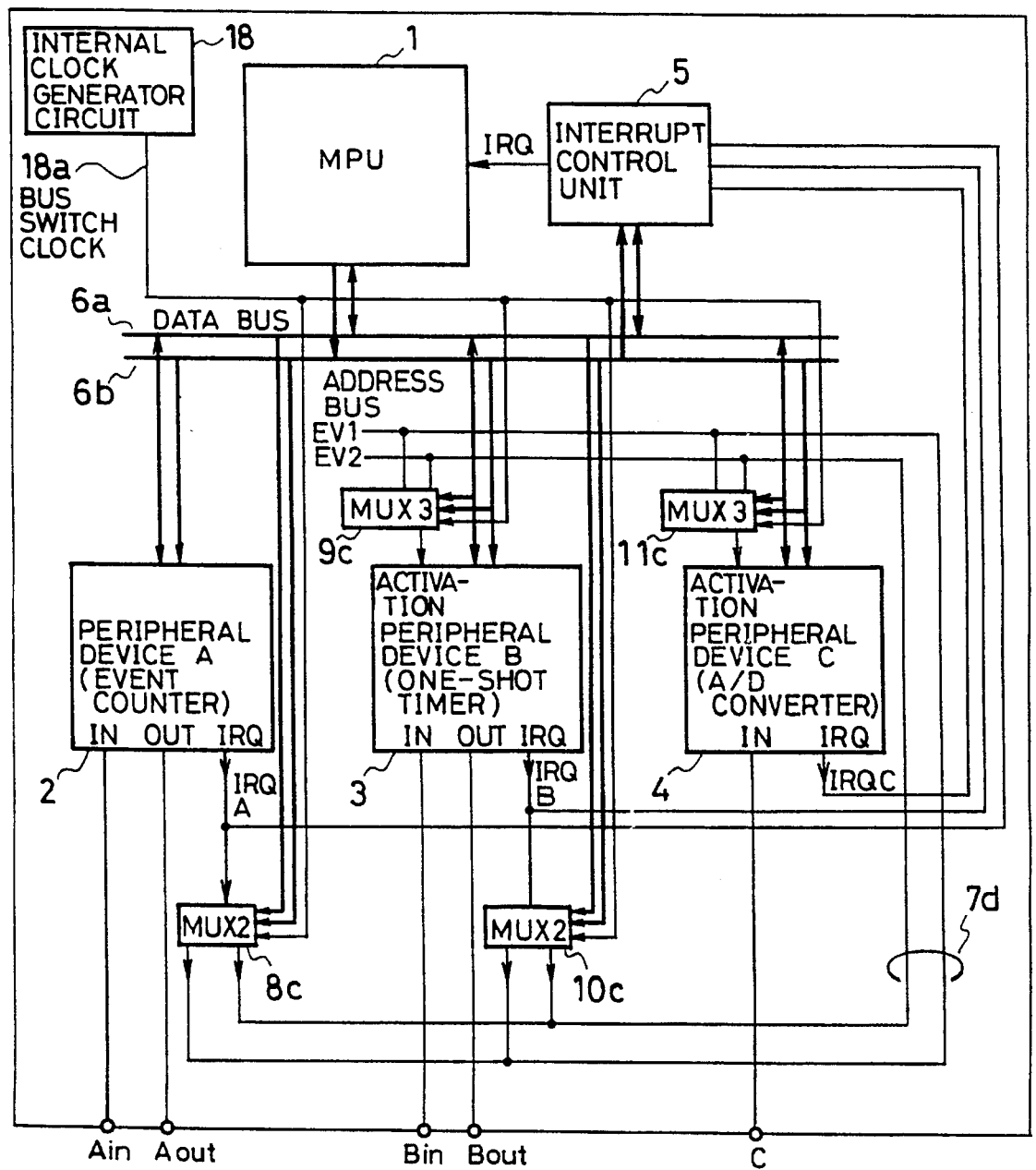
FIG. 12 is a block diagram of the whole configuration of Embodiment 4.

FIG. 12 is a diagram of another embodiment in which the above-mentioned time-division processing function is provided to Embodiment 1 of FIG. 1. The same reference symbols as those of FIG. 1 represent like elements, and their description is omitted. In the figure, reference symbol 7d represents event buses as signal transmission means for transmitting signals between a plurality of peripheral devices. Since the number of event buses needs to be less than Embodiment 1 of FIG. 1 due to the time-division processing function, there are only two signal lines EV1 and EV2. Reference symbols 8c to 11c represent multiplexers (MUX 2, MUX 3) as connection switch means for connecting a plurality of the peripheral devices with the signal transmission means selectively and on a time-division basis, and 18 an internal clock generator circuit provided originally in the microcomputer, which generates an internal clock for supply to the multiplexers 8c to 11c as a bus switch clock 18a.

Figure 13:
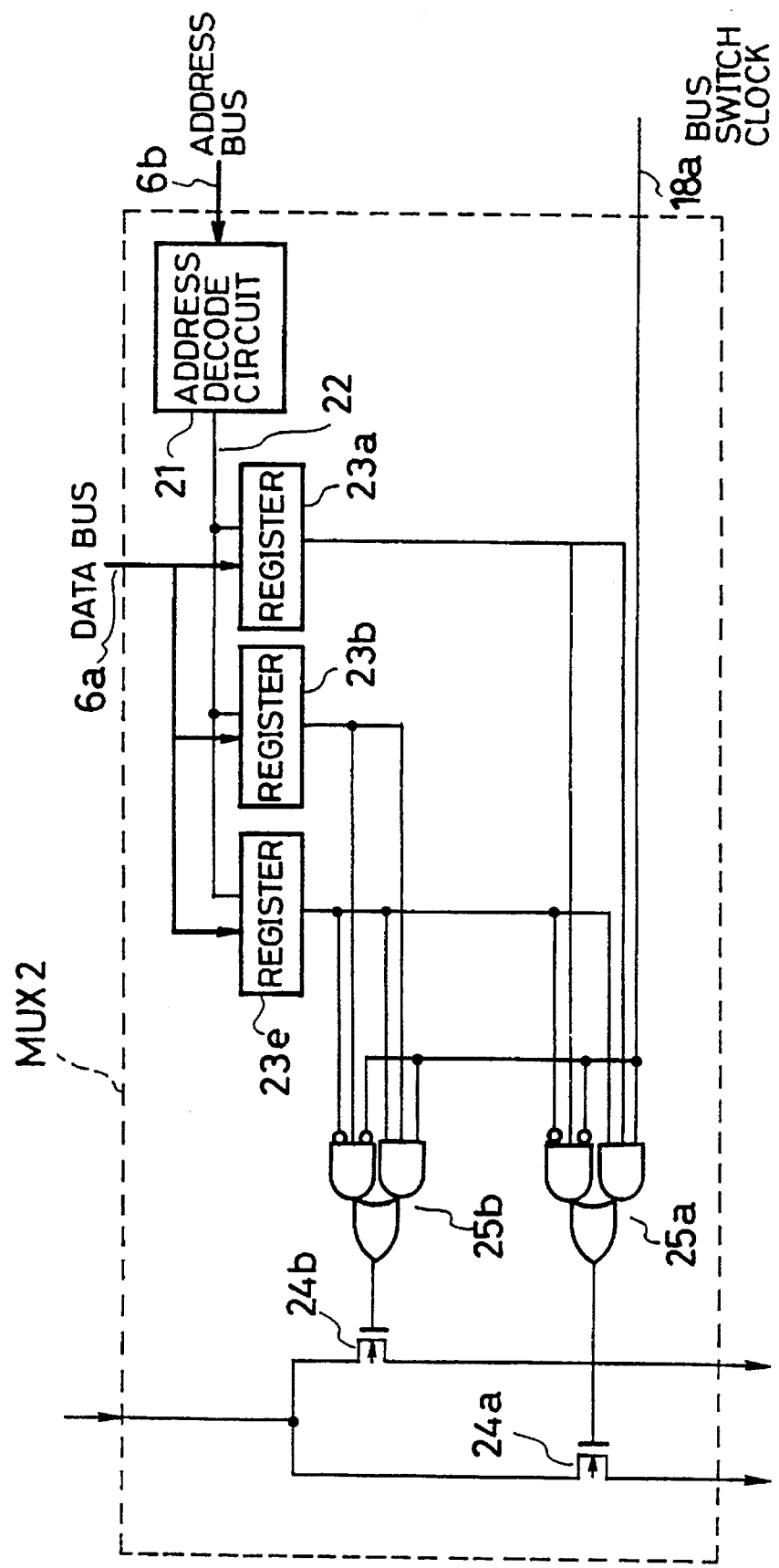
FIG. 13 is a diagram of the internal configuration of the multiplexer (MUX 2) of FIG. 12.
Figure 14:
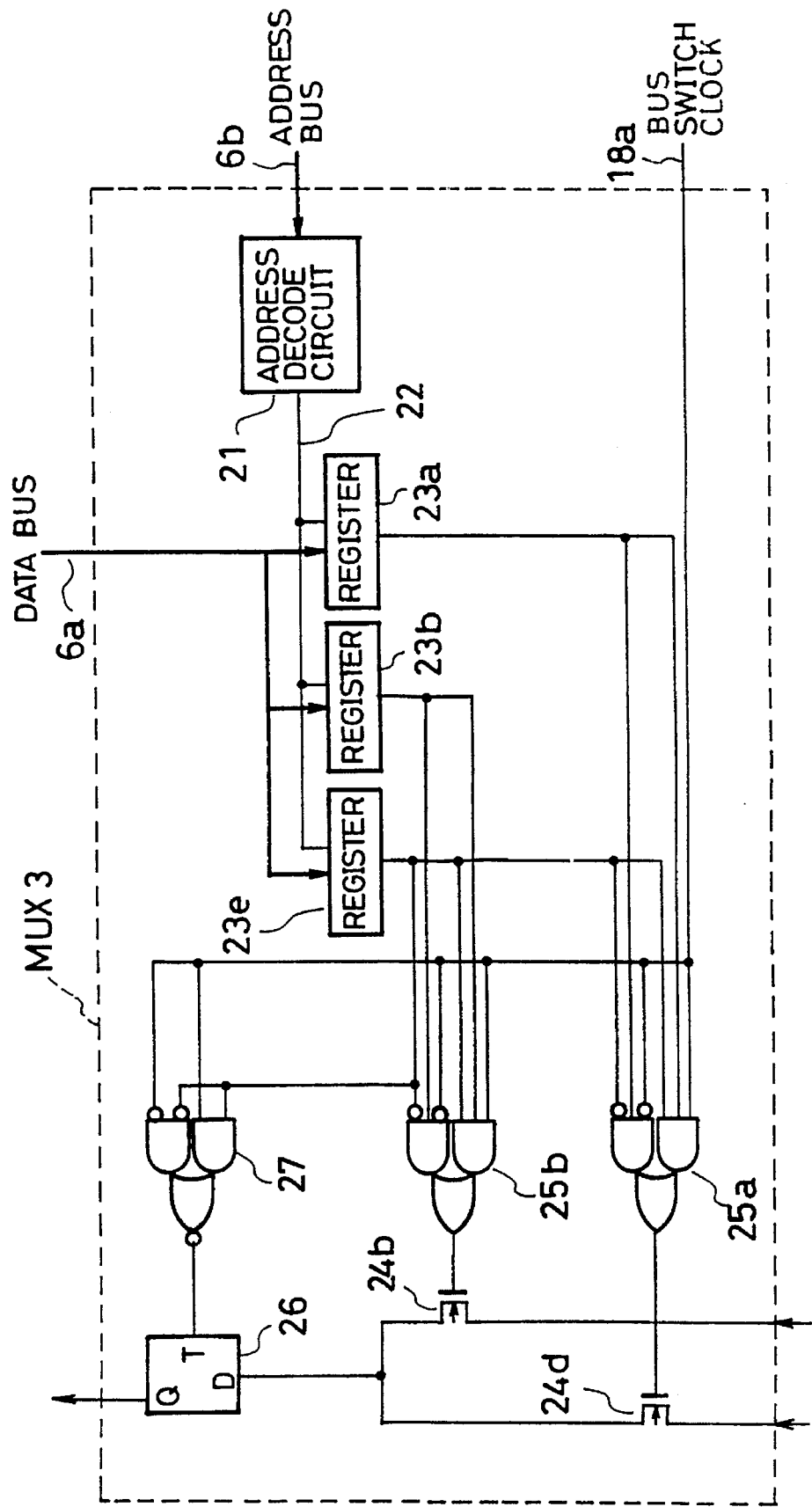
FIG. 14 is a diagram of the internal configuration of the multiplexer (MUX 3) of FIG. 12.

The above-mentioned multiplexers 8c to 11c correspond to the multiplexers 8a to 11a of Embodiment 1 (FIG. 1), and are connected in the same manner as those of Embodiment 1. However, to achieve a time-division processing function, it is structured as shown in FIG. 13 and FIG. 14. FIG. 13 shows a multiplexer (MUX 2) for connecting the event counter 2 and the terminal IRQ of the one-shot timer 3 with one of the event buses 7d, and the same reference symbols as those of FIG. 2 represent like elements. As in FIG. 2, the same number of registers 23a and 23b for selecting a signal line and n-channel transistors 24a and 24b as the event buses 7d are provided. Furthermore, a register 23e for selecting the polarity of the bus switch clock and logic gates 25a and 25b for selection and time-division control of the transistors 24a and 24b according to the outputs of the registers 23a, 23b and 23e and the bus switch clock 18a are added. In other words, the transistor 24a or 24b selected by a value set in the registers 23a and 23b for selecting a signal line is turned on when the polarity of the bus switch clock 18a agrees with a polarity specified by a value set by the register 23e for selecting the polarity of the bus switch clock. Therefore, when the same signal line of the event buses 7d is used to transmit different events on a time-division basis, one of the registers 23e for selecting the polarity of the bus switch clock is set at "1" and the other register 23e is set at "0". FIG. 14 shows a multiplexer (MUX 3) for connecting the one-shot timer 3 and the start terminal of the A/D converter 4 with one of the event buses 7d, which differs from the multiplexer (MUX 2) shown in FIG. 13 in that a D latch 26 for holding events and a logic gate 27 for controlling the D latch 26 according to the bus switch clock 18a and the output of the register 23e for selecting the polarity of the bus switch clock are provided. The above-mentioned D latch 26 holds event signals when the selected transistors are turned on through time-division control while the transistors are turned off and provides the signals to the peripheral devices.

In this way, Embodiment 4 can achieve the same function and effect as Embodiment 1 shown in FIG. 1, and can reduce the number of the signal lines of the event buses.

Embodiment 5

Figure 6:
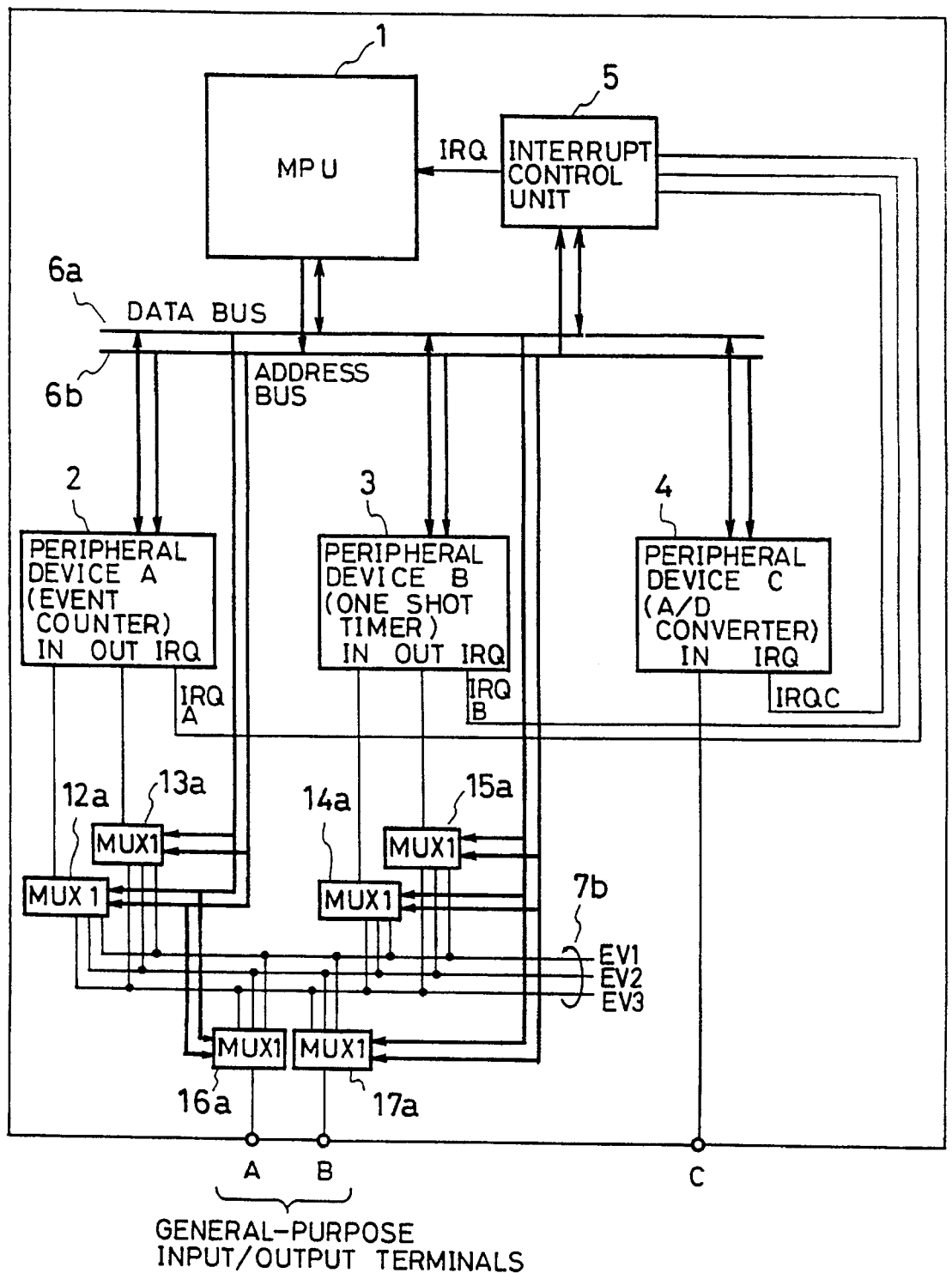
FIG. 6 is a block diagram of the whole configuration of Embodiment 2.
Figure 15:
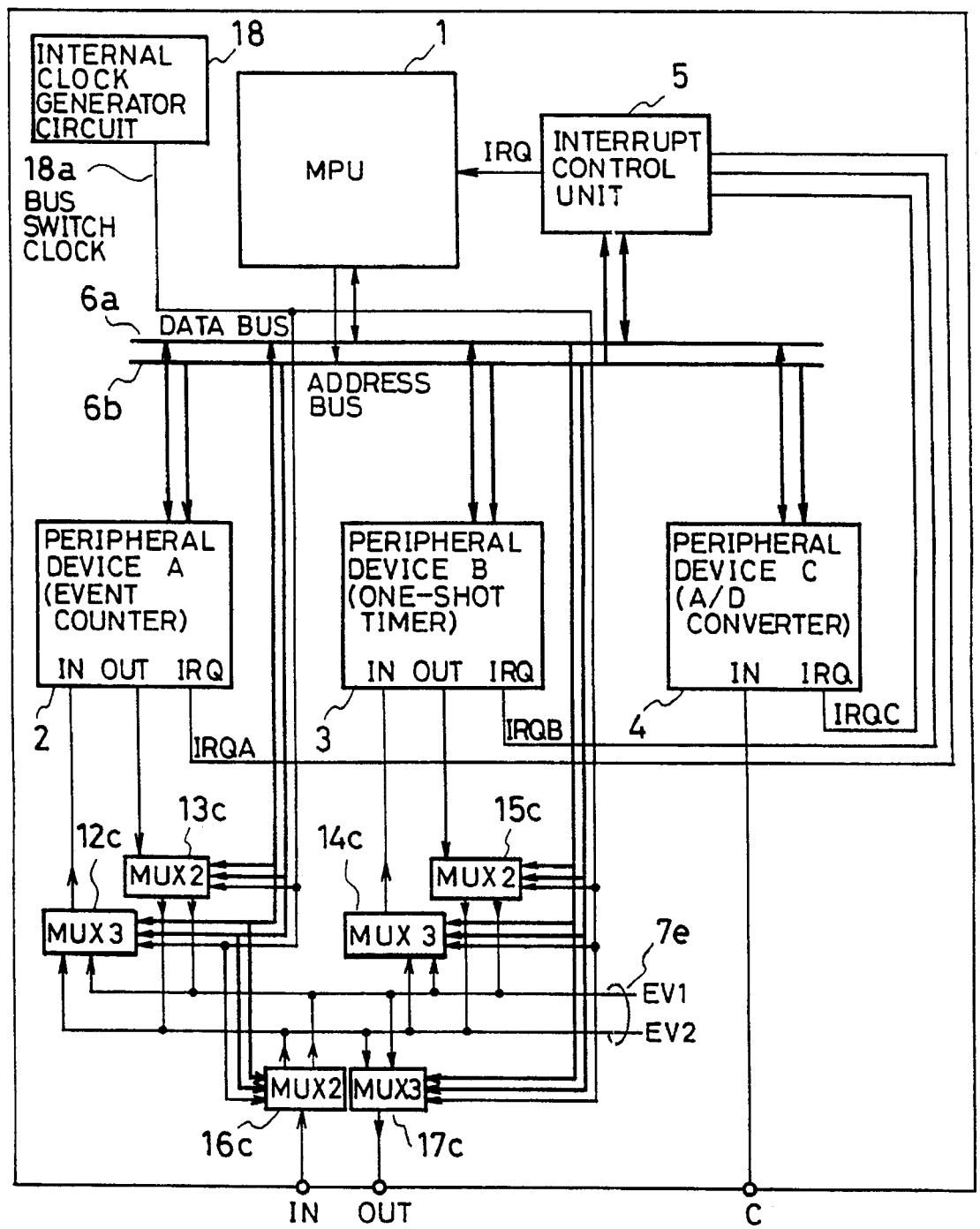
FIG. 15 is a block diagram of the whole configuration of Embodiment 5.

FIG. 15 is a diagram of another embodiment of the present invention in which a time-division processing function is provided to Embodiment 2 shown in FIG. 6. The same reference symbols as those of FIG. 6 and FIG. 12 represent like elements, and their description is omitted. In FIG. 15, reference symbol 7e represents event buses as signal transmission means for transmitting signals between a plurality of peripheral devices and a plurality of external terminals. Since the number of event buses needs to be less than Embodiment 2 of FIG. 6 due to the time-division processing function, there are only two signal lines EV1 and EV2. Reference symbols 12c to 17c represent multiplexers (MUX 2, MUX 3) as connection switch means for connecting a plurality of peripheral devices or a plurality of external terminals with the signal transmission means selectively and on time-division basis. The multiplexers correspond to the multiplexers 12a to 17a of Embodiment 2 shown in FIG. 6, and are connected in the same manner and have the same structure as those shown in FIG. 13 and FIG. 14. Since the multiplexers are constructed for one-way transmission, external terminals consist of an external input terminal exclusively used for signal input and an external output terminal exclusively used for signal output. However, it is easy to modify these one-way multiplexers into two-way multiplexers, and it is possible to change the external terminals to general-purpose input/output terminals A and B as shown in FIG. 6 of Embodiment 2.

In this way, Embodiment 5 can achieve the same function and effect as Embodiment 2 shown in FIG. 6, and can reduce the number of the signal lines of the event buses.

Embodiment 6

Figure 16:
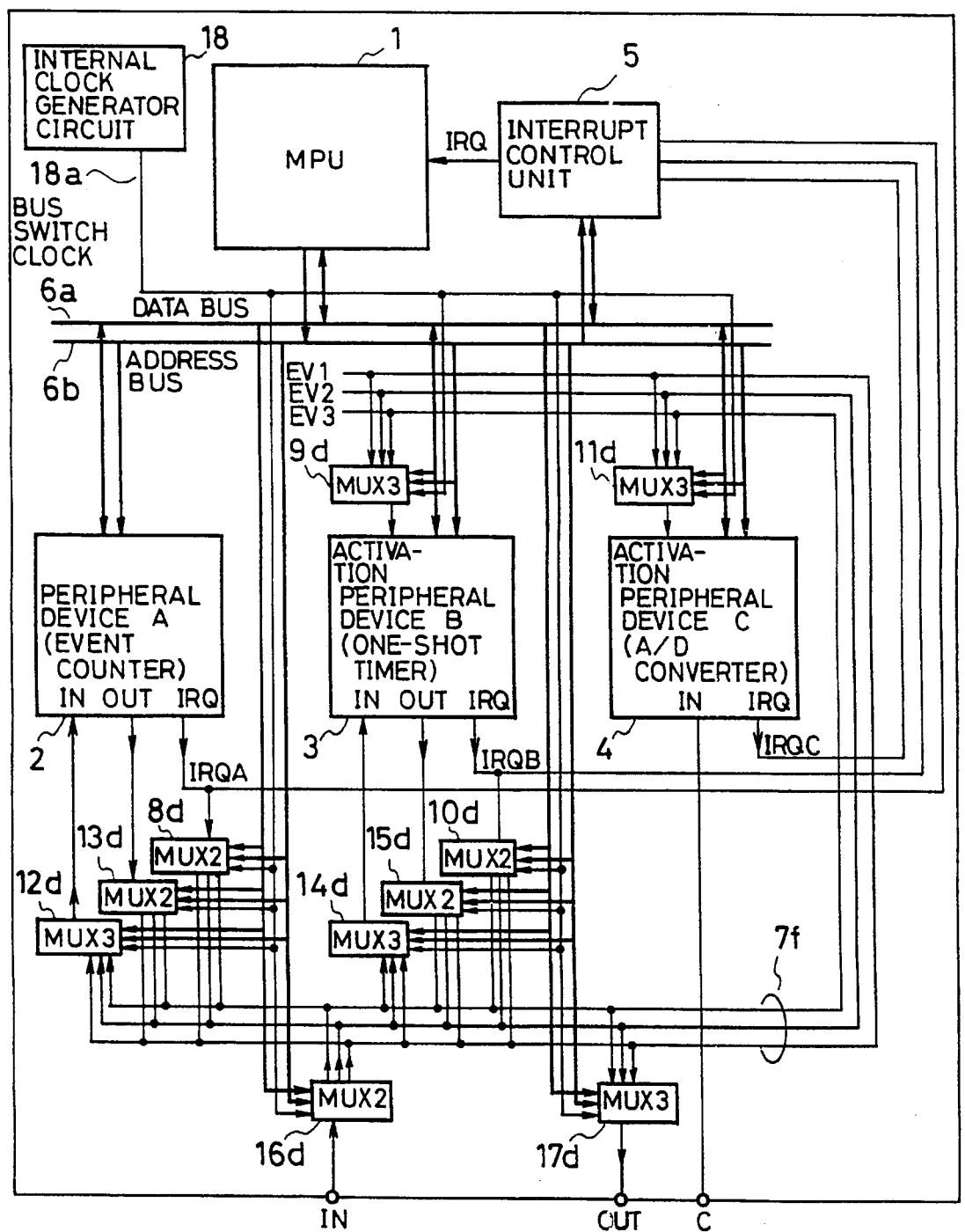
FIG. 16 is a block diagram of the whole configuration of Embodiment 6.
Figure 17:
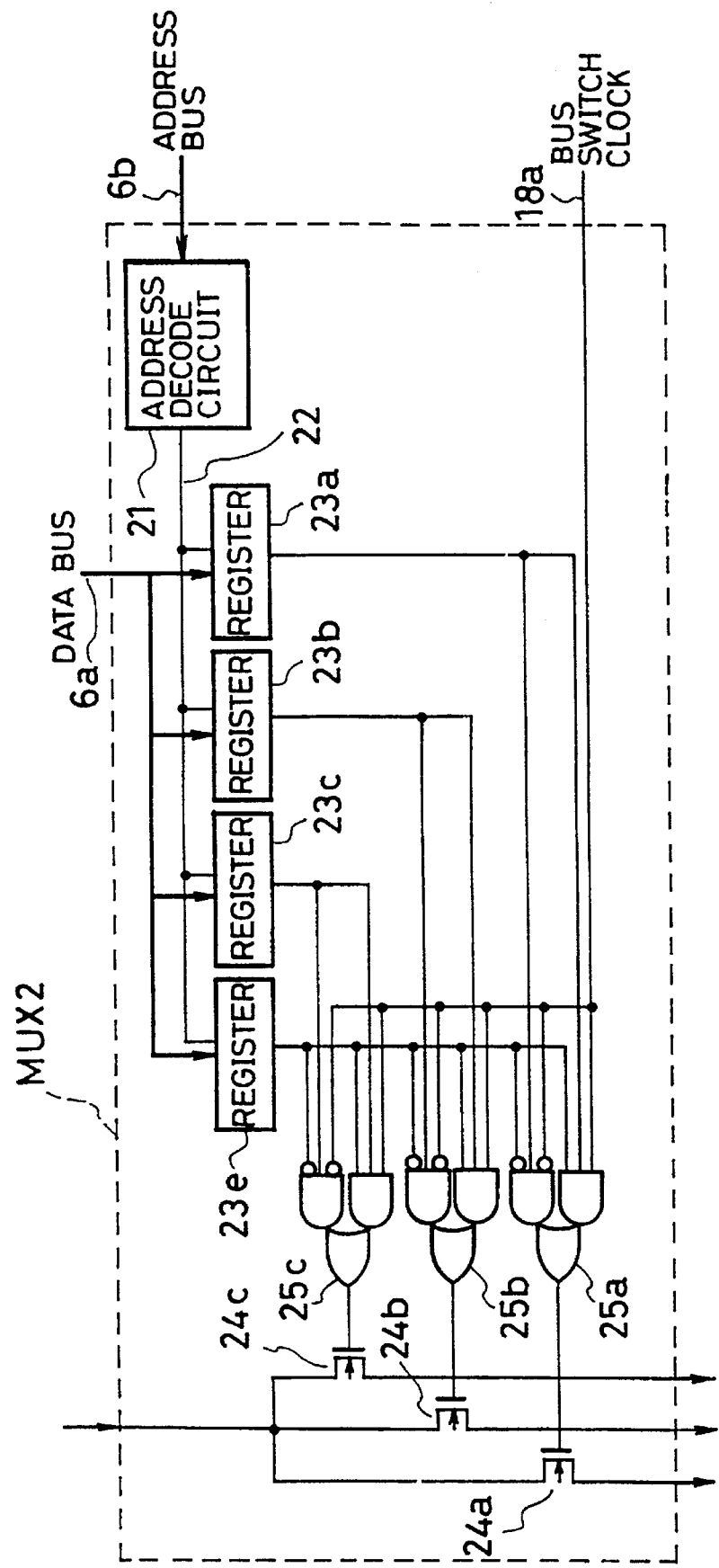
FIG. 17 is a diagram of the internal configuration of the multiplexer (MUX 2) of FIG. 16.
Figure 18:
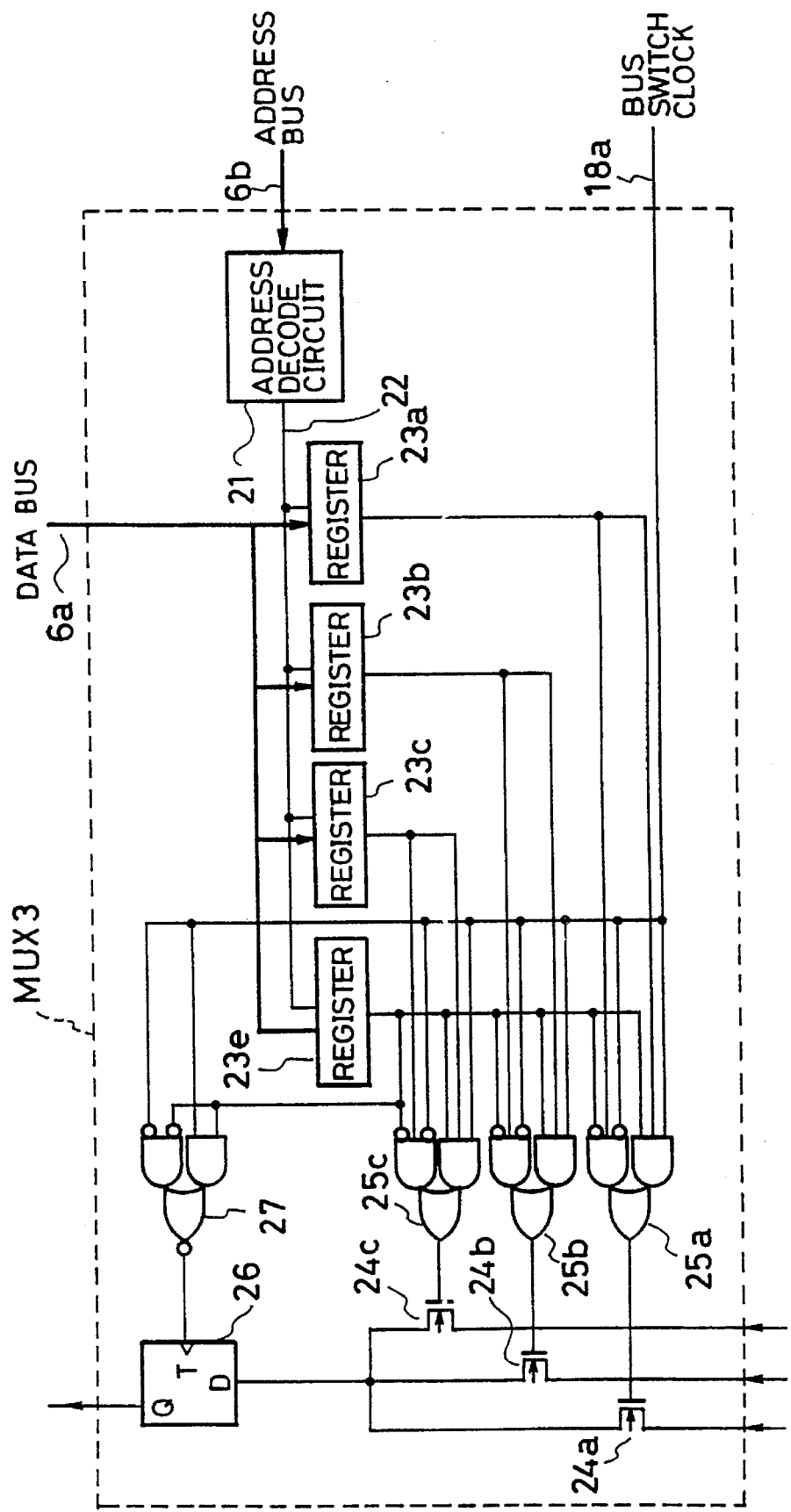
FIG. 18 is a diagram of the internal configuration of the multiplexer (MUX 3) of FIG. 16.

FIG. 16 shows another embodiment of the present invention in which a time-division processing function is added to Embodiment 3 shown in FIG. 8. The same reference symbols as those of FIG. 8, FIG. 12 and FIG. 15 represent like elements, and their description is omitted. In FIG. 16, reference symbol 7f represent event buses as signal transmission means for transmitting signals between a plurality of peripheral devices and between a plurality of peripheral devices and a plurality of external terminals. Since the number of event buses needs to be less than Embodiment 3 of FIG. 8 due to the time-division processing function, there are three signal lines EV1, EV2 and EV3. Reference symbols 8d to 17d represent multiplexers (MUX 2, MUX 3) as connection switch means for connecting a plurality of the peripheral devices and a plurality of the external terminals with the signal transmission means selectively and on a time-division basis. The multiplexers 8d to 17d correspond to the multiplexers 8b to 17b of Embodiment 3 (FIG. 8), and are connected in the same manner and have the same structure as the multiplexers (MUX 2, MUX 3) of Embodiments 4 and 5. Since Embodiment 6 has one more signal line of the event buses 7f than Embodiments 4 and 5, a register 23c, a transistor 24c and a logic gate 25c are added to the multiplexers of FIG. 13 and FIG. 14 as shown in FIG. 17 and FIG. 18.

In this way, Embodiment 6 can achieve the same function and effect as Embodiment 3 of FIG. 8, and can reduce the number of the signal lines of the event buses.

As described in the foregoing, according to the first embodiment, a semiconductor device having an MPU and a plurality of peripheral devices controlled by the MPU through a bus comprises a plurality of signal transmission means for transmitting signals between a plurality of the peripheral devices and connection switch means for selectively connecting a plurality of the peripheral devices with a plurality of the signal transmission means so that without the use of the MPU, with the result of improved system processing speed due to a lightened processing burden on the MPU, increased response speed due to the elimination of the use of the MPU, and easy changes in the interconnection of the peripheral devices.

According to the second embodiment, a semiconductor device having an MPU, a plurality of peripheral devices controlled by the MPU through a bus and a plurality of external terminals connected to the peripheral devices comprises a plurality of signal transmission means for transmitting signals between a plurality of the peripheral devices and a plurality of the external terminals and connection switch means for selectively connecting a plurality of the peripheral devices or a plurality of the external terminals with a plurality of the signal transmission means so that the connection between the external terminals and the peripheral devices can be changed with the effect of eliminating external terminals which are not frequently used.

Furthermore, according to the third embodiment, a semiconductor device having an MPU, a plurality of peripheral devices controlled by the MPU through a bus and a plurality of external terminals connected to the peripheral devices comprises a plurality of signal transmission means for transmitting signals between a plurality of the peripheral devices and between a plurality of the peripheral devices and a plurality of the external terminals, and connection switch means for selectively connecting a plurality of the peripheral devices and a plurality of the external terminals with a plurality of the signal transmission means so that control information can be transmitted directly between the peripheral devices, thus making possible automatic control without the use of the MPU, with the result of improved system processing speed due to a lightened processing burden on the MPU, increased response speed due to the elimination of the use of the MPU, and easy changes in the interconnection of the peripheral devices. In addition, since the connection between the external terminals and the peripheral devices can be changed, external terminals which are not frequently used can be eliminated.

According to the fourth embodiment, a semiconductor device having an MPU and a plurality of peripheral devices controlled by the MPU through a bus comprises signal transmission means for transmitting signals between a plurality of the peripheral devices and connection switch means for connecting a plurality of the peripheral devices with the transmission signal means selectively and on a time-division basis so that the device can achieve the same effects as the first embodiment and can reduce the number of signal transmission means due to the time-division processing function of the connection switch means.

According to the fifth embodiment, a semiconductor device having an MPU, a plurality of peripheral devices controlled by the MPU through a bus and a plurality of external terminals connected to the peripheral devices comprises signal transmission means for transmitting signals between a plurality of the peripheral devices and a plurality of the external terminals and connection switch means for connecting a plurality of the peripheral devices or a plurality of the external terminals with the signal transmission means selectively and on a time-division basis so that the device can achieve the same effects as the second embodiment and can reduce the number of signal transmission means due to the time-division processing function of the connection switch means.

Furthermore, according to the sixth embodiment, a semiconductor device having an MPU, a plurality of peripheral devices controlled by the MPU through a bus and a plurality of external terminals connected to the peripheral devices comprises signal transmission means for transmitting signals between a plurality of the peripheral devices and between a plurality of the peripheral devices and a plurality of the external terminals and connection switch means for connecting a plurality of the peripheral devices and a plurality of the external terminals with the signal transmission means selectively and on a time-division basis so that the device can achieve the same effects as the third embodiment and can reduce the number of the signal transmission means due to the time-division processing function of the connection switch means.

What is claimed is:

1. A semiconductor device including a microprocessor; a bus coupled to said microprocessor; first and second peripheral devices, each controlled by said microprocessor through said bus, and each having a data input and a data output; first and second external terminals for coupling said semiconductor device to an external device; and a subsystem for transferring data between said peripheral devices and said external device using a reduced number of external terminals, said subsystem comprising:

a plurality of signal paths;

a first multiplexer, coupled to said first external terminal and having a first control input coupled to said bus, for selecting a first one of said plurality of signal paths to transfer data between said external device and a particular one of said first and second peripheral devices;

a second multiplexer, coupled to said second external terminal and having a second control input coupled to said bus, for selecting a second one of said plurality of signal paths to transfer data between said external device and a particular one of said first and second peripheral devices;

a third multiplexer, coupled to said data input of said first peripheral device and having a third control input coupled to said bus, for selecting among said plurality of signal paths, including said first one and said second one, to enable data to be transmitted from said external device to said first peripheral device through a particular one of said first and second external terminals;

a fourth multiplexer, coupled to said data output of said first peripheral device and having a fourth control input coupled to said bus, for selecting among said plurality of signal paths, including said first one and said second one, to enable data to be transmitted from said first peripheral device to said external device through a particular one of said first and second external terminals;

a fifth multiplexer, coupled to said data input of said second peripheral device and having a fifth control input coupled to said bus, for selecting among said plurality of signal paths, including said first one and said second one, to enable data to be transmitted from said external device to said second peripheral device through a particular one of said first and second external terminals; and a sixth multiplexer, coupled to said data output of said second peripheral device and having a sixth control input coupled to said bus, for selecting among said plurality of signal paths, including said first one and said second one, to enable data to be transmitted from said second peripheral device to said external device through a particular one of said first and second external terminals.

2. The semiconductor device of claim 1, further including a clock generator circuit for generating a clock signal; and means, coupled to said first, second, third, fourth, fifth, and sixth multiplexers, for operating said multiplexers on a time-division basis responsive to said clock signal.

3. A semiconductor device including a microprocessor; a bus coupled to said microprocessor; first and second peripheral devices, each controlled by said microprocessor through said bus, each having an interrupt signal output and an activation input, and each having a data input and a data output; first and second external terminals for coupling said semiconductor device to an external device; and a subsystem for controlling operation of said peripheral devices without resort to interrupt processing by said microprocessing and for transferring data between said peripheral devices and said external device using a reduced number of external terminals, said subsystem comprising:

a plurality of signal paths;

a first multiplexer, coupled to said interrupt signal output of said first peripheral device and having a first control input coupled to said bus, for selecting a first one of said plurality of signal paths to transmit a first interrupt signal from said first peripheral device to said second peripheral device to activate said second device; and a second multiplexer, coupled to said activation input of said second peripheral device and having a second control input coupled to said bus, for selecting said first one of said plurality of signal paths to receive said first interrupt signal from said first peripheral device to activate said second peripheral device;

a third multiplexer, coupled to said first external terminal and having a third control input coupled to said bus, for selecting a third one of said plurality of signal paths to transfer data between said external device and a particular one of said first and second peripheral devices;

a fourth multiplexer, coupled to said second external terminal having a fourth control input coupled to said bus, for selecting a fourth one of said plurality of signal paths to transfer data between said external device and a particular one of said first and second peripheral devices;

a fifth multiplexer, coupled to said data input of said first peripheral device and having a fifth control input coupled to said bus, for selecting among said plurality of signal paths, including said third one and said fourth one, to enable data to be transmitted from said external device to said first peripheral device through a particular one of said first and second external terminals;

a sixth multiplexer, coupled to said data output of said first peripheral device and having a sixth control input coupled, to said bus, for selecting among said plurality of signal paths, including said third one and said fourth one, to enable data to be transmitted from said first peripheral device to said external device through a particular one of said first and second external terminals;

a seventh multiplexer, coupled to said data input of said second peripheral device and having a seventh control input coupled to said bus, for selecting among said plurality of signal paths, including said third one and said fourth one, to enable data to be transmitted from said external device to said second peripheral device through a particular one of said first and second external terminals; and an eighth multiplexer, coupled to said data output of said second peripheral device and having a eighth control input coupled to said bus, for selecting among said plurality of signal paths, including said third one and said fourth one, to enable data to be transmitted from said second peripheral device to said external device through a particular one of said first and second external terminals.

4. The semiconductor device of claim 3, further including a clock generator circuit for generating a clock signal; and means, coupled to said first, second, third, fourth, fifth, sixth, seventh, and eighth multiplexers, for operating said multiplexers on a time-division basis responsive to said clock signal.

5. A semiconductor device including a microprocessor; a bus coupled to said microprocessor; first, second and third peripheral devices, each controlled by said microprocessor through said bus and each having an activation input and an interrupt signal output; and a subsystem for controlling operation of said peripheral devices without resort to interrupt processing in the microprocessor, said subsystem comprising:

a plurality of signal paths;

a first multiplexer, coupled to said interrupt signal output of said first peripheral device and having a first control input coupled to said bus, for selecting a first one of said plurality of signal paths to transmit a first interrupt signal from said first peripheral device to a particular one of said second and third peripheral devices;

a second multiplexer, coupled to said interrupt signal output of said second peripheral device and having second a control input coupled to said bus, for selecting a second one of said plurality of signal paths to transmit a second interrupt signal from said second peripheral device to a particular one of said second and third peripheral devices;

a third multiplexer, coupled to said activation input of said second peripheral device and having a third control input coupled to said bus, for selecting between said first one of said plurality of signal paths to receive said first interrupt signal from said first peripheral device for activating said second peripheral device, and said second one of said plurality of signal paths to receive said second interrupt signal from said second peripheral device for activating said second peripheral device;

a fourth multiplexer, coupled to said activation input of said third peripheral device and having a fourth control input coupled to said bus, for selecting between said first one of said plurality of signal paths to receive said first interrupt signal from said first peripheral device for activating said third peripheral device, and said second one of said plurality of signal paths to receive said second interrupt signal from said second peripheral device for activating said third peripheral device;

a clock generator circuit for generating a clock signal; and means, coupled to said first, second, third, and fourth multiplexers, for operating said multiplexers on a time-division basis responsive to said clock signal.

* * * * *